Aug. 2, 1960  F. W. FENTON  2,947,405
PATTERN-DETERMINING APPARATUS FOR PALLET LOADER
Filed Dec. 31, 1956  11 Sheets-Sheet 1
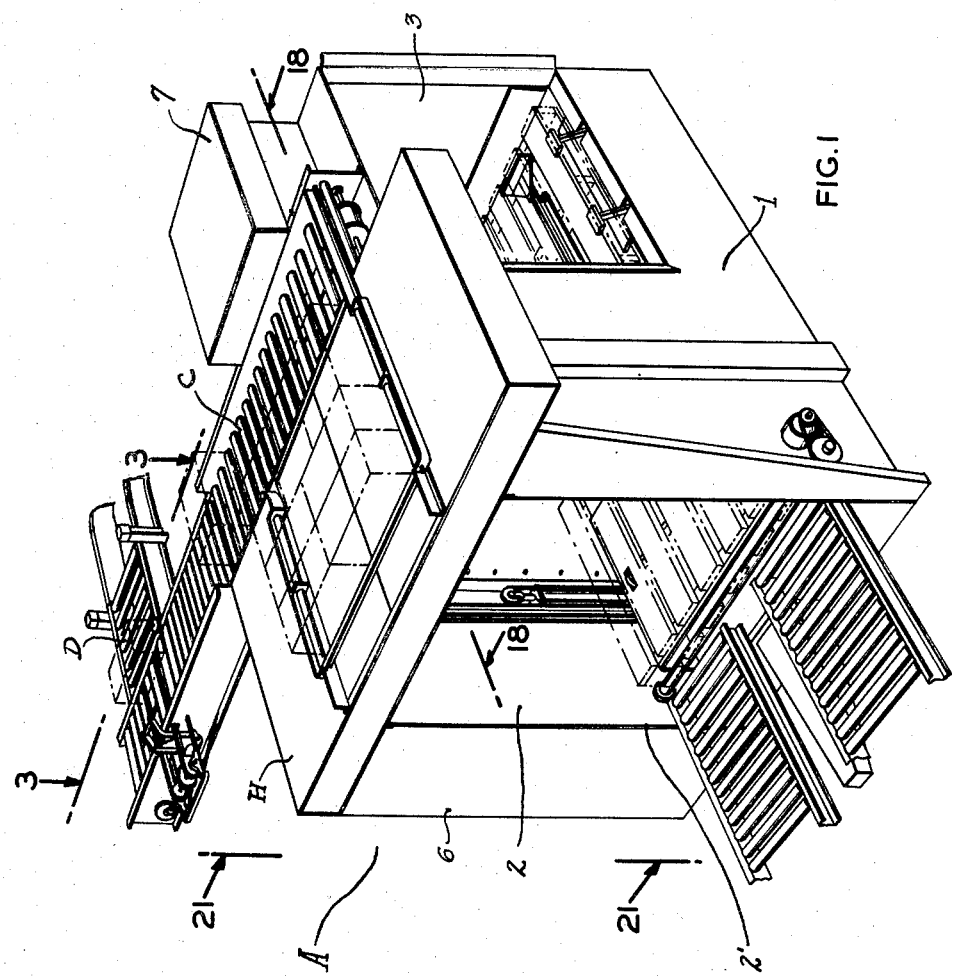
INVENTOR.
FRANK W. FENTON
BY Ralph N. Kalish
ATTORNEY

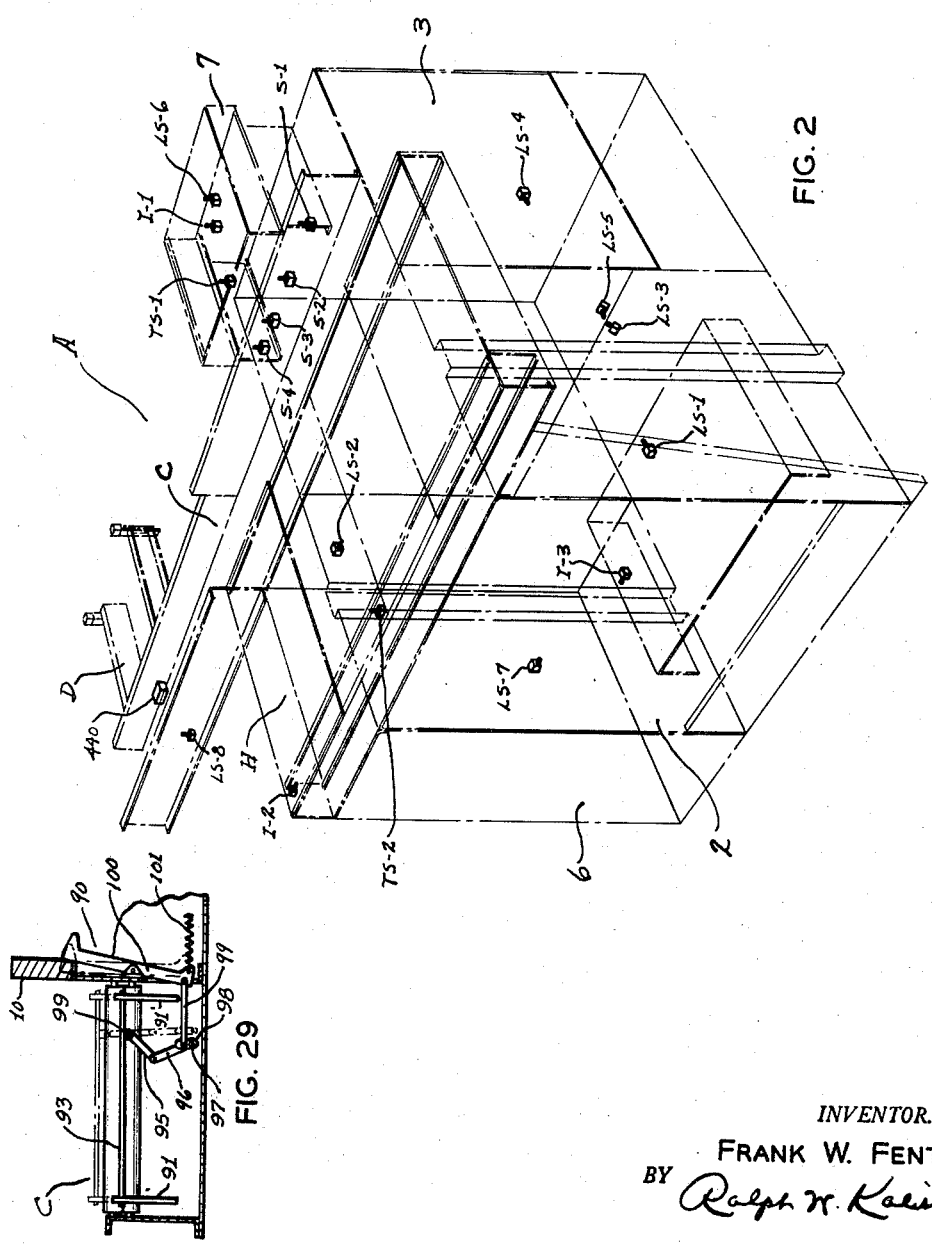

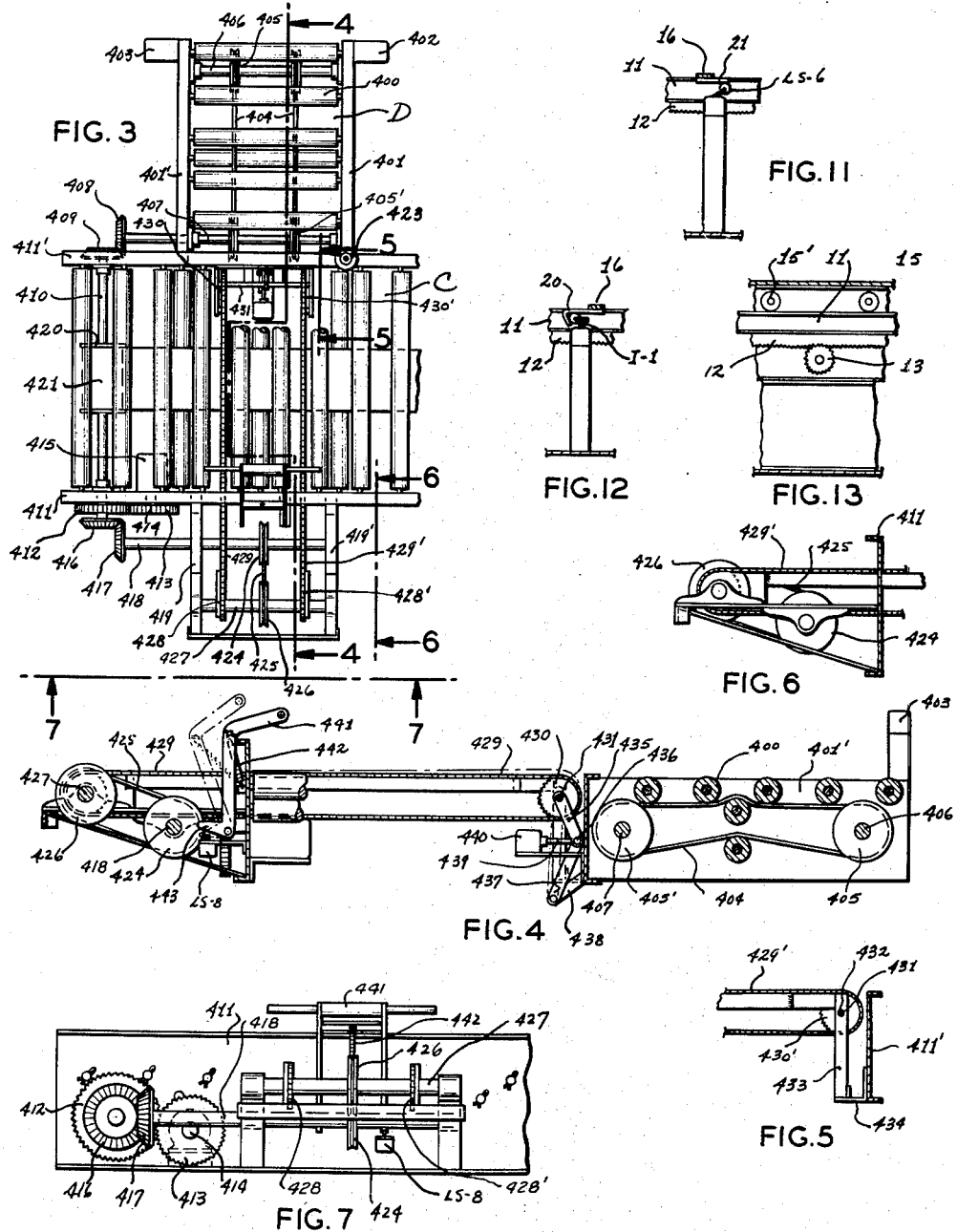

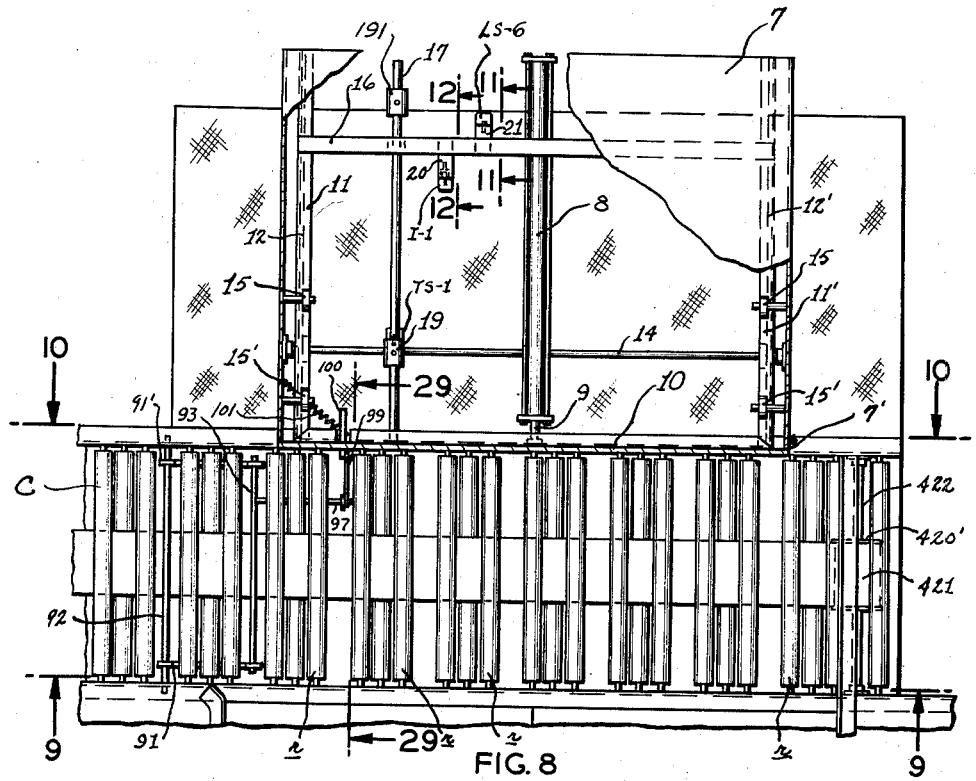
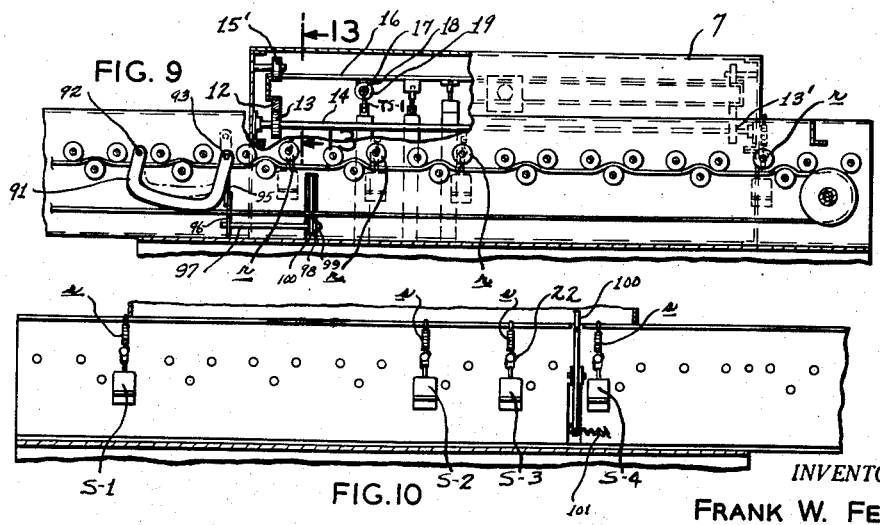

Aug. 2, 1960   F. W. FENTON   2,947,405
PATTERN-DETERMINING APPARATUS FOR PALLET LOADER
Filed Dec. 31, 1956   11 Sheets-Sheet 5
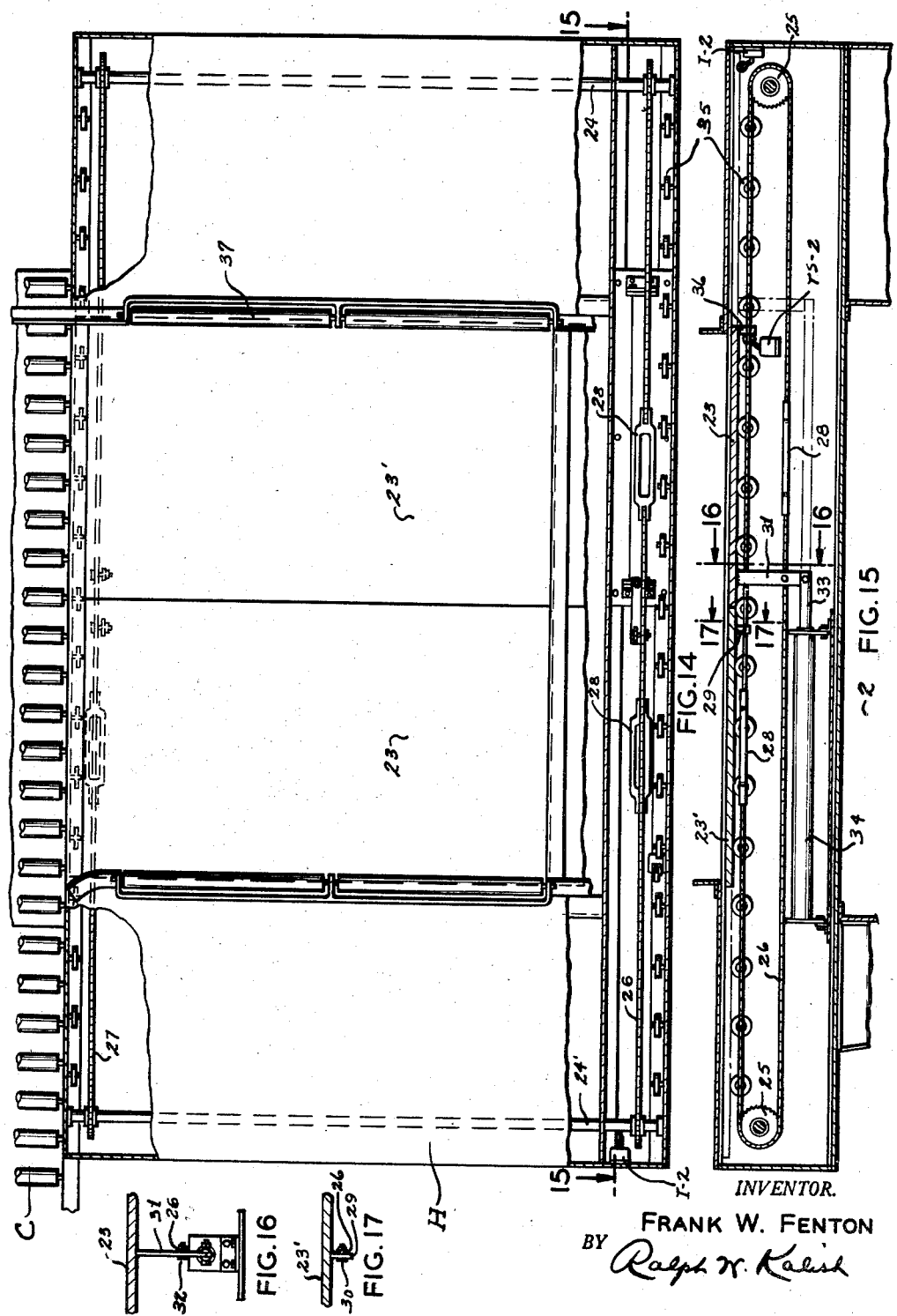
INVENTOR.
FRANK W. FENTON
BY Ralph W. Kalish
ATTORNEY

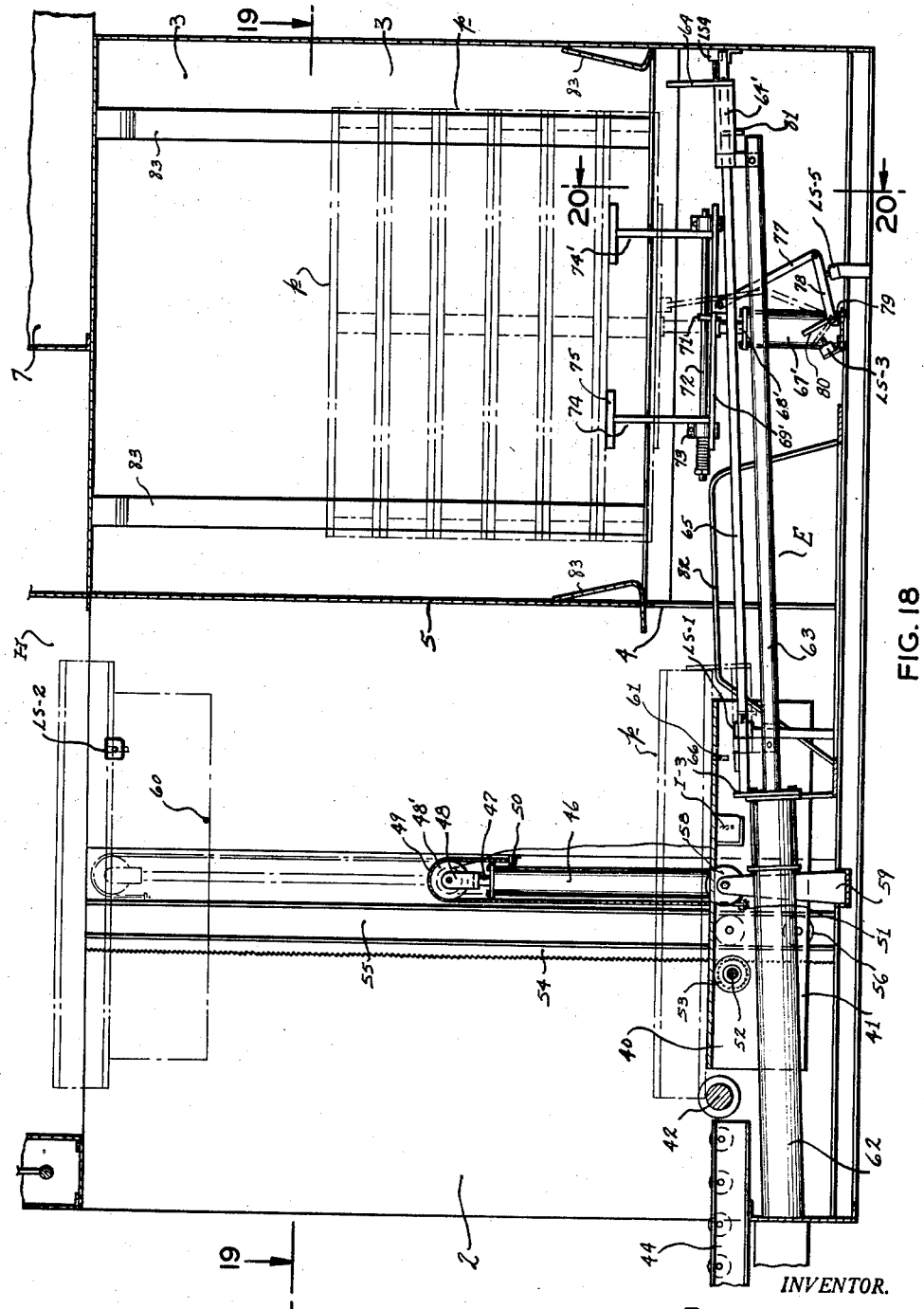

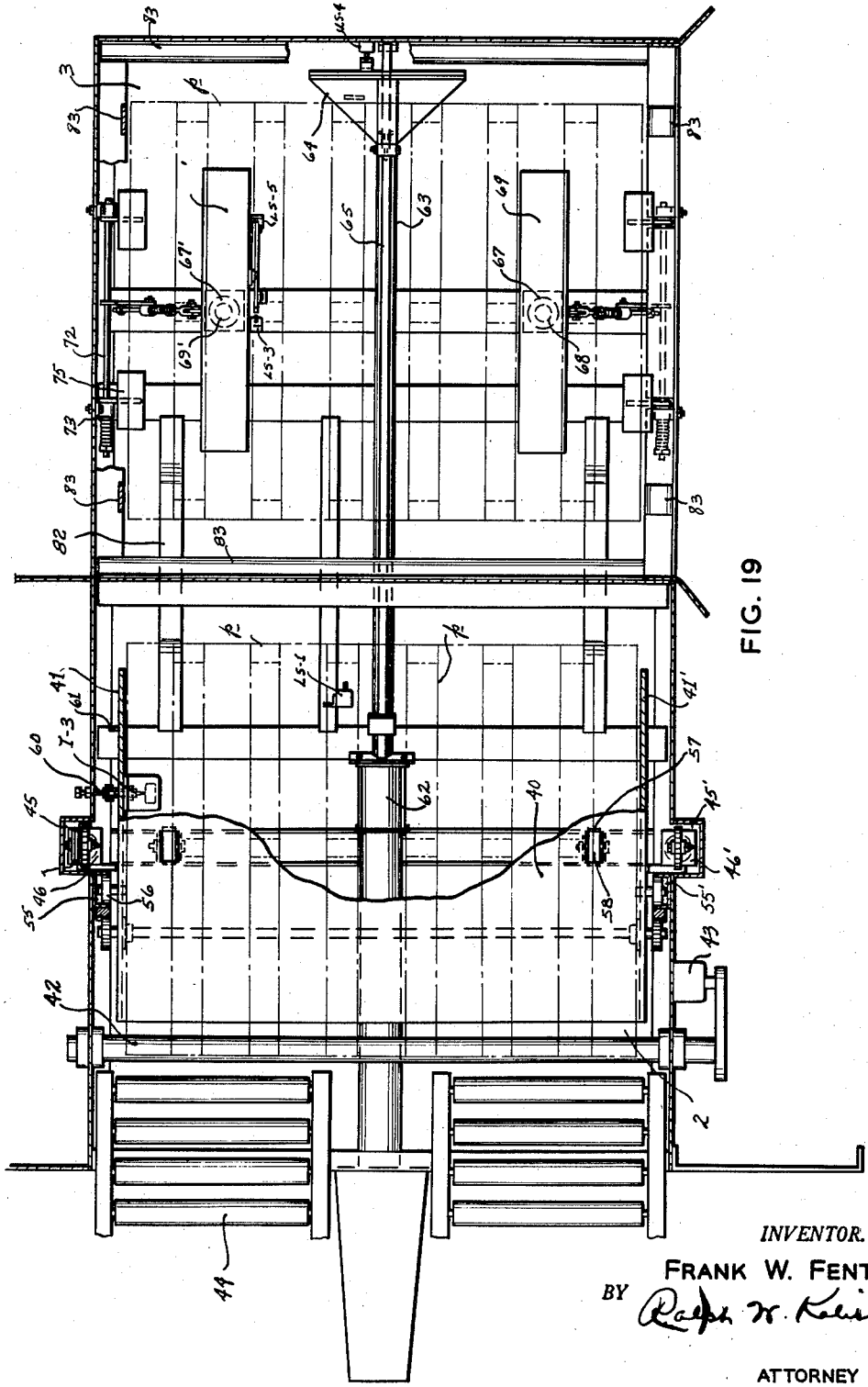

Aug. 2, 1960
F. W. FENTON
2,947,405
PATTERN-DETERMINING APPARATUS FOR PALLET LOADER
Filed Dec. 31, 1956
11 Sheets-Sheet 8
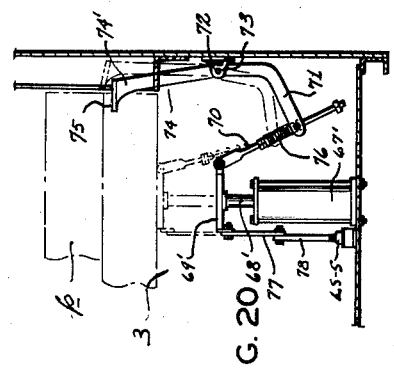
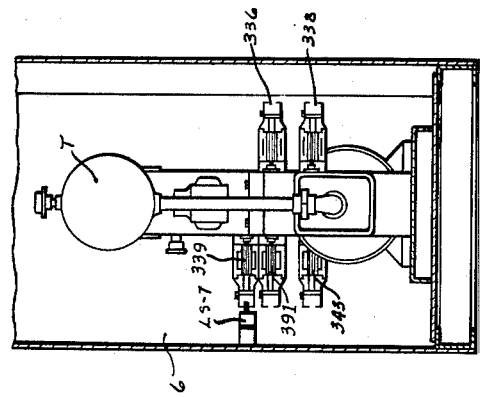
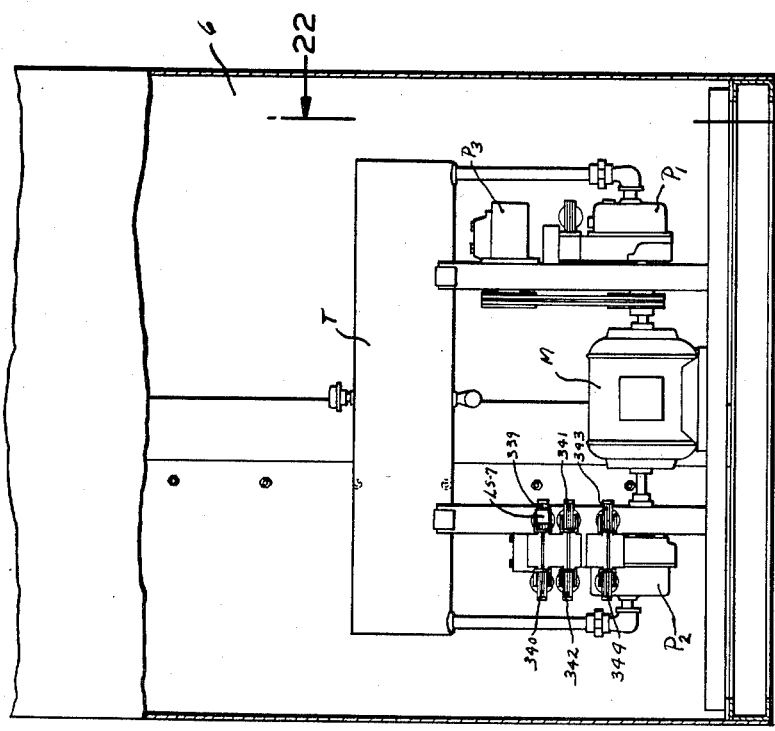
INVENTOR.
FRANK W. FENTON
BY
ATTORNEY INVENTOR.
FRANK W. FENTON
BY Ralph W. Kalish
ATTORNEY

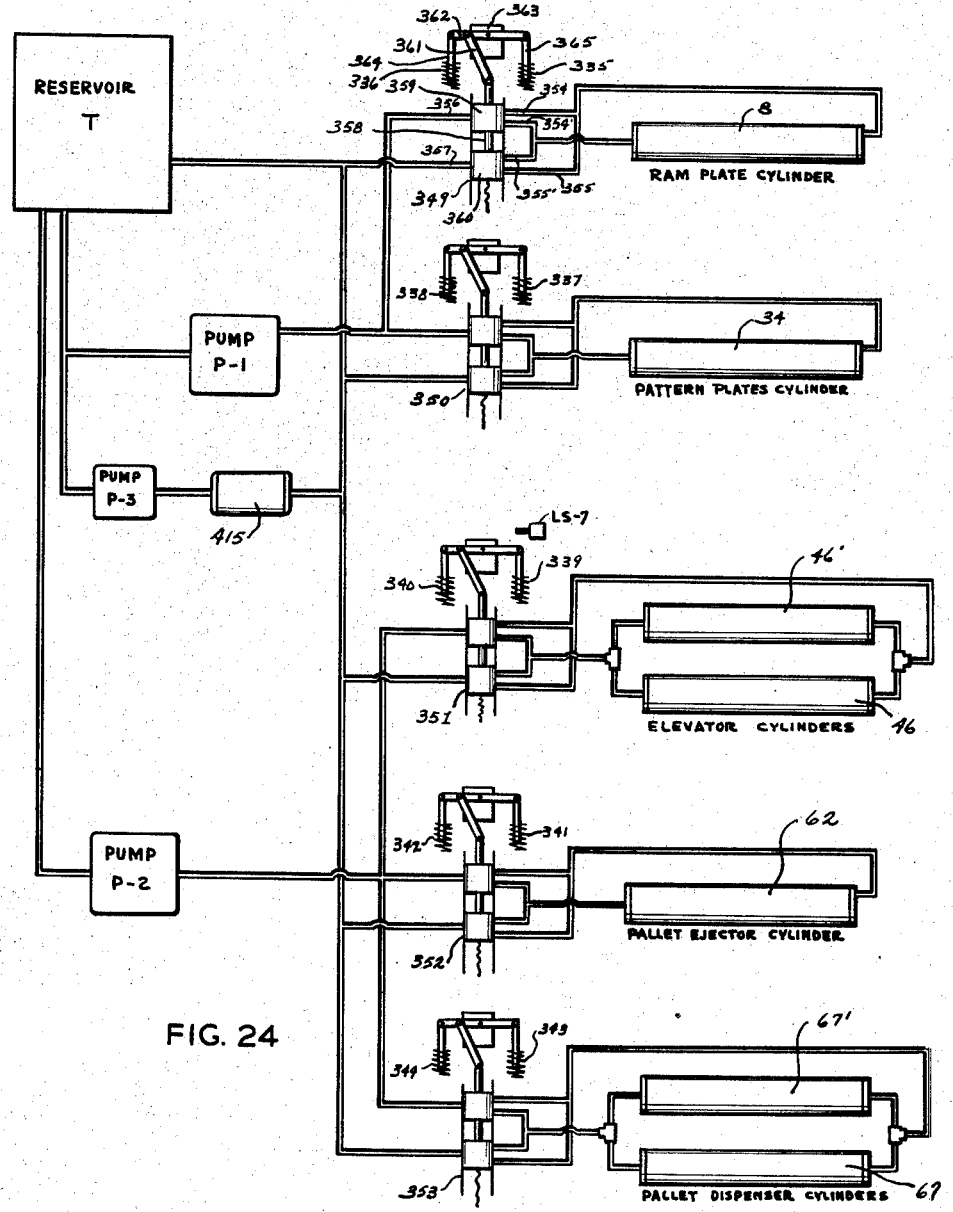

Aug. 2, 1960 F. W. FENTON 2,947,405
PATTERN-DETERMINING APPARATUS FOR PALLET LOADER
Filed Dec. 31, 1956 11 Sheets-Sheet 11

INVENTOR.
FRANK W. FENTON
BY Ralph W. Kalish
ATTORNEY

United States Patent Office 2,947,405
Patented Aug. 2, 1960

2,947,405

PATTERN-DETERMINING APPARATUS FOR PALLET LOADER

Frank W. Fenton, Lemay, Mo., assignor to Beacon Production Equipment Corporation, St. Louis, Mo., a corporation of Illinois Filed Dec. 31, 1956, Ser. No. 631,831

9 Claims. (Cl. 198—33)

This invention relates in general to material handling and, more particularly, to a machine for loading pallets or to a so-called palletizer.

With the ever increasing widespread usage of pallets in industry today for purposes of storing, as well as the transporting of material loaded thereon, various efforts have been made to develop machines for assisting in the loading of such pallets. It has been recognized that the manual loading of pallets is in many instances uneconomical in view of the costliness of human labor, and the necessary time consumed through the individual handling of each unit to be loaded. Fatigue is a most considerable factor and hence will casue the utilization of relatively large labor forces for loading purposes or the provision of non-productive rest periods for smaller forces. Therefore, by hand loading of pallets a substantial cost item is incurred. Numerous of the attempts heretofore for reducing such cost have been directed to semi-automatic devices which require the constant attention and efforts of a small, but select, and hence, relatively high salaried labor group. The provision of an automatic machine for receiving various units to be loaded on a pallet, such as from an assembly line or a supply point, and causing the same to be stacked in a stable manner upon a pallet, without the constant attention of assistants would in a very short period of time pay for itself, and thereby, conduce to more competitive pricing of the mechandise being so handled. In conjuuction with the loading of pallets there have developed various article or unit arrangements to create what is termed in industry "a locked load," so that each layer or tier of stacked units creates an integrated locking element, thereby rendering the load resistant to inadvertent and undesired displacement. Consequently, pallet loading machines must necessarily be adapted to stack units upon a pallet in such fashion as to develop a locked load which will thus be cohesive and unitary.

Therefore, it is an object of the present invention to provide a machine adapted for automatically receiving individual units, such as cartons and the like, and causing same to be stacked in a pre-arranged manner upon a pallet for full loading of the latter.

Another object of the present invention is to provide a pallet loading machine having means for automatically discharging thereof a loaded pallet and simultaneously delivering an empty pallet thereto for receiving the succeeding load.

Another object of the present invention is to provide a pallet loading machine which is adapted for continuous operation so that as one pallet is fully loaded, an empty pallet is delivered thereto from an associated empty pallet reservoir and disposed for the next load whereby the increment of time intervening between the completion of one load and the starting of the next is minimal.

Another object of the present invention is to provide a pallet loading machine having associated therewith means for presenting load-forming units thereto in such attitude as to provide a locking pattern to the developed load.

An additional object of the persent invention is to provide a pallet loading machine having a unit turning device adapted for automatic operation in a predetermined sequence so as to provide any one of innumerable locking patterns to the pallet load.

Another object of the present invention is to provide a pallet loading machine adapted for handling load units of varying size, dimensions, and character, and for the stacking of such units upon a pallet in any number of predetermined tiers or layers.

A further object of the present invention is to provide a pallet loading machine incorporating unique control means whereby the various requisite operations will be automatically effected in a reliable, rapid manner and in properly predetermined sequence.

An additional object of the present invention is to provide a pallet loading machine having an electrical control system which is designed for continuous operation; which does not require periodic exterior actuation; and which does not require costly maintenance or supervision.

A further object of the present invention is to provide a pallet loading machine which comprises a compact, fully integrated structure, so that the same may be easily transported from one location to another and which hence does not entail expensive installation.

A further object of the present invention is to provide a pallet loading machine having a simplicity of design; which is economical in operation and maintenance; which may be easily incorporated in any existing assembly line or warehousing operation; and which is relatively unexpensive in production; and which obviates the need for labor.

These and other detailed objects are obtained by the structures illustrated in the accompanying drawings (11 sheets), in which—

Figure 1 is a perspective view of a pallet loading machine constructed in accordance with and embodying the present invention.

Figure 2 is a phantom drawing of the machine showing the location of the switches thereon.

Figure 3 is a plan view taken along the line 3—3 of Figure 1.

Figure 4 is a horizontal transverse section taken along the line 4—4 of Figure 3.

Figure 5 is a horizontal transverse section taken along the line 5—5 of Figure 3.

Figure 6 is a horizontal transverse section taken along the line 6—6 of Figure 3.

Figure 7 is an end view taken along line 7—7 of Figure 3.

Figure 8 is a top plan view of the ram plate assembly with the housing therefor partially cut away.

Figure 9 is a horizontal transverse section taken along the line 9—9 of Figure 8.

Figure 10 is a horizontal transverse section taken along the line 10—10 of Figure 8.

Figure 11 is a horizontal transverse section taken along the line 11—11 of Figure 8.

Figure 12 is a horizontal transverse section taken along the line 12—12 of Figure 8.

Figure 13 is a horizontal transverse section taken along the line 13—13 of Figure 9.

Figure 14 is a top plan view of the pattern plates and related structure, showing the housing therefor as being partially broken away.

Figure 15 is a horizontal transverse section taken along the line 15—15 of Figure 14.

Figure 16 is a horizontal transverse section taken along the line 16—16 of Figure 15.

Figure 17 is a horizontal transverse section taken along the line 17—17 of Figure 15.

Figure 18 is a vertical transverse section taken along the line 18—18 of Figure 1.

Figure 19 is a horizontal transverse section taken along the line 19—19 of Figure 18.

Figure 20 is a vertical transverse section taken along the line 20—20 of Figure 18.

Figure 21 is a vertical transverse section taken along the line 21—21 of Figure 1.

Figure 22 is an end view taken along the line 22—22 of Figure 21.

Figure 24 is a diagram of the hydraulic system of the present invention.

Figure 25 is a detail of Figure 24 showing limit switch LS-7 in circuit-open relation.

Figure 29 is a vertical transverse section taken on the line 29—29 of Figure 8.

Figure 23:
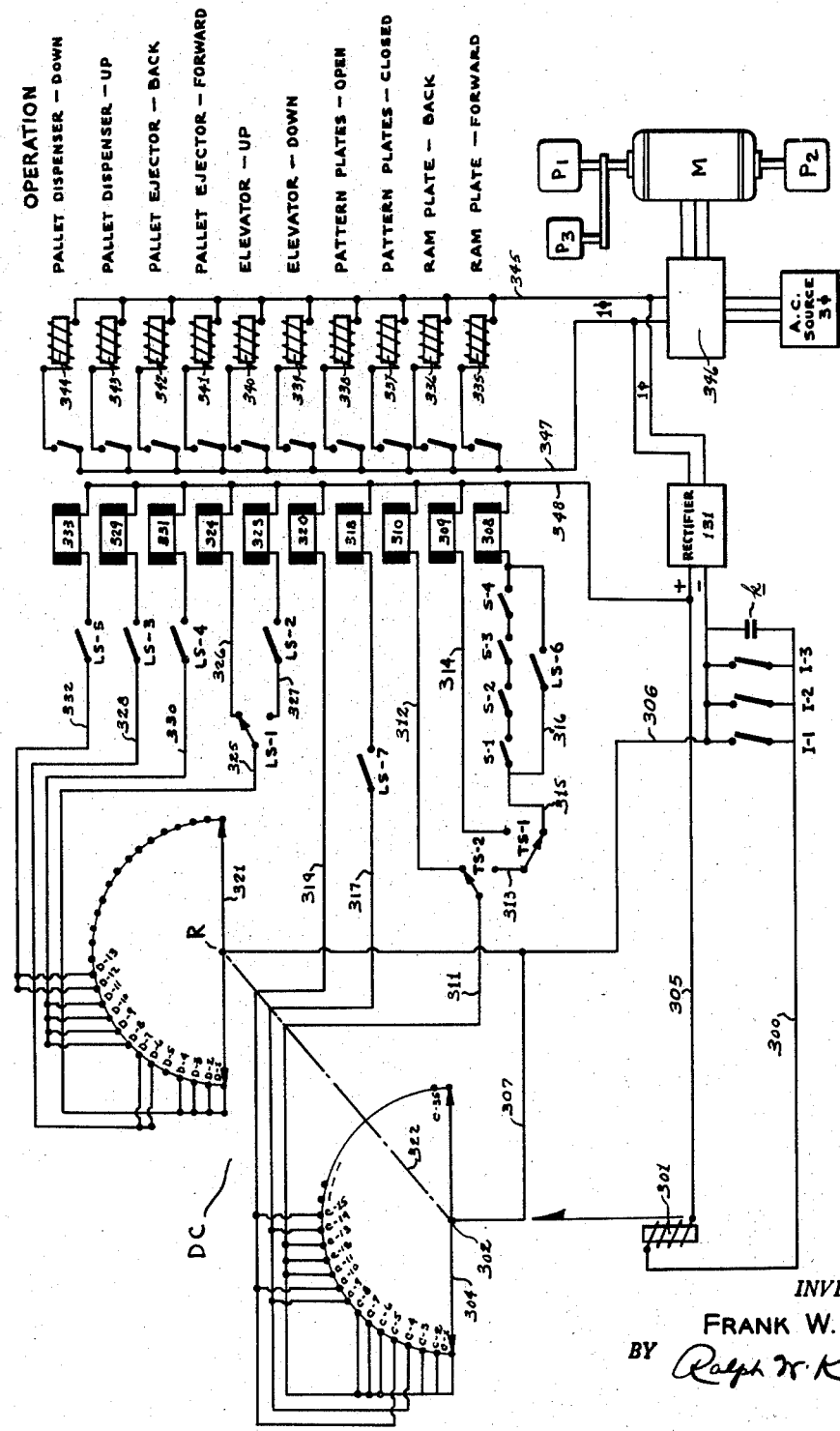
Figure 23 is a wiring diagram of the circuit for operating the machine.

In essence, the machine of the present invention, being designed for automatic operation, is adapted to receive, as from a supply source, units to be stacked and convey the same to a ram plate which delivers the units, a row at a time, to pattern or collector plates upon which a tier of such units will be disposed; the particular arrangement or pattern of the units being predetermined by pattern-forming means affecting the attitude of the unit as presented to the ram plate. The tier of units thus formed is then deposited upon a loading pallet carried by an elevator with the latter being caused to descend an increment of travel corresponding to the height of the tier as each successive tier of units is received thereon. When the elevator with the pallet fully loaded with the tiered or stacked units reaches the lower limit of its descent, the loaded pallet is discharged onto a conveyor for ultimate handling, as by a fork lift truck, or the like, and an empty pallet is presented on the elevator which is then returned to its upper position for repetition of the pallet loading operation cycle.

It should be recognized that any type of stackable container or device may be pallet loaded by the present invention, such as, for instance, cartons, boxes, beverage bottle cases, drums, etc. However, for the sake of simplicity, such stackable members will be referred to hereinbelow as units which are preferably of non-cubic design, whereby the same may be readily amenable to arrangement in, what has been termed, an interlocking pattern, wherein certain or all units on one tier or layer of the load are presented with their longitudinal axes in normal relationship to the adjacent units in the tiers immediately above and below, whereby each tier thus becomes a locking unit in an integrated load, rendering the latter reliably stable.

As stated, in the present invention there is provided pattern-forming or -determining means which is adapted to present the units to the machine for developing a load having one of innumerable, preselected locking patterns. Nevertheless, to facilitate the description of the present machine, the pattern-forming means will be described subsequent to the detailed description of the construction and basic operation of the machine.

Referring now by reference characters to the drawings which illustrate the preferred embodiment of the present invention, A generally designates a pallet-loading machine or palletizer having a main frame 1 constructed in a conventional manner of structural members and sheet metal, the latter being so designed and arranged as to present in the forward portion of the machine an elevator well 2, which is open to the front for providing a discharge opening 2'; an empty pallet magazine or chamber 3 located rearwardly of elevator well 2 and communicating therewith through a transverse opening 4 (Figure 18) in a dividing wall 5 through which opening an empty pallet p may be delivered for purposes presently appearing; said pallet chamber 3 being open on one side for receiving therethrough a stack of empty pallets, as by a truck. Adjacent elevator well 2 and laterally thereof is a compartment 6 (Figure 2) for a prime mover M and hydraulic pumps P-1, P-2.

Extending transversely across machine A is a conveyor C, being preferably of the powered roller type, located above the forward portion of pallet chamber 3, and immediately rearwardly of the upper end of elevator well 2. Said conveyor C extends laterally beyond machine A for communicating adjacent its extremity with a unit-feeding conveyor D leading from a source of supply, an assembly line, and the like. Disposed rearwardly of conveyor C, upon the rearward portion of the upper end of machine A, is a housing 7 for a unit-impelling ram plate assembly (Figure 8) comprising a horizontal, longitudinally extending fluid cylinder 8, having a piston 9 on the forward end of which is centrally fixed a transverse ram plate 10, which may be of channel stock, with its web presented forwardly, extending substantially from side to side of housing 7 and being adapted for reciprocal forward and rearward movement, through an opening 7' in the forward end of said housing 7, across the adjacent portion of conveyor C upon operation of piston 9 for pushingly moving therefrom units which have been delivered thereto. Secured, as by welding, to the rearward face of said ram plate 10, at either of its ends, are parallel side plates 11, 11' preferably of channel form with flanges thereof directed inwardly; there being a rack 12, 12', respectively fixed to the under surface of the lower flange of said side plates 11, 11' for engaging pinions 13, 13', respectively, carried on a cross bar 14 extending between, and journaled at its ends in, the adjacent side walls of housing 7 for stabilizing ram plate 10 in its reciprocal travel path. Presented for engaging the upper flange of each side plate 11, 11' are rollers 15, 15', freely rotatable on rods fixed in the housing side walls for inhibiting undesired vertical tilting of ram plate 10. An end member 16 extends transversely between side plates 11, 11', in axial parallel relationship to ram plate 10, and spacedly forwardly of the rearward ends of said side plates 11, 11'.

Also engaged at its forward end to the rearward face of ram plate 10 is a rod 17, axially parallel to side plates 11, 11', with its rearward end supported in a bracket 18 carried upon end member 16; there being adjustably mounted upon said rod 17 a pair of spaced apart, forward and rearward switch actuating blocks or members 19, 19' for engaging a reversing or toggle switch TS-1, of the snap-lock type, for purposes presently appearing. Mounted toward the rear of housing 7 is an impulse switch I-1 presented for triggering by a lug 20 carried on end member 16 upon rearward movement of ram plate 10, and which will be over-ridden upon forward travel thereof. Adjacent impulse switch I-1 and supported upon a suitable standard is a normally closed, limit switch LS-6 for actuation by a lug 21 fixed on end member 16 when ram plate 10 is in full rearward position so that during such interval the said engagement of the switch will cause same to be held in circuit-open condition for purposes presently appearing.

Within the particular section of conveyor C in front of, or adjacent, ram plate 10, are, for purposes of illustration, four rollers r, located above the associated belt, which are supported by springs s at their ends in the adjacent structural members, which springs s bias said rollers r into upper position or aligned relation with the adjacent fixed rollers; said springs s permitting downward vertical movement of said rollers r under an applied load;

such as the disposition thereon of the units presented for movement by ram plate 10. The rearward ends of said rollers r, as at 22, are disposed for engaging interlock switches S-1, S-2, S-3 and S-4 which are connected in series. Thus when all four of said rollers r are depressed by the load thereon, which operates against the spring tension, said switches S-1, S-2, S-3 and S-4 will be closed so as to complete the circuit therethrough. However, if less than all of said rollers r are depressed then said circuit will remain open in view of the fact that these said switches are connected in series. Obviously, upon removal of the depressing units from the rollers r the same, through bias of their associated springs, will be restored to normal position and thereby open their associated switches.

Forwardly of conveyor C and above elevator well 2 is a pattern or collector plate housing H (see Figs. 14 to 17 inclusive), which is centrally open on its under surface for communication with, and forming an extension of, elevator well 2, while in the corresponding or aligned portion of its upper surface is provided with a pair of cooperating horizontally presented pattern plates 23, 23' adapted for retractable, lateral movement away from each other for opening and reciprocally toward each other for closing of housing H; in closed condition said pattern plates 23, 23' meet on their inner longitudinal margin and in such position define the upper end of elevator well 2. For effecting operation of pattern plate 23, 23', between open and closed condition, is an operating system comprising a pair of axially parallel shafts 24, 24' disposed at either end of said housing H with their ends suitably journaled in the forward and rearward walls thereof. Aligned sprockets 25 are carried by each shaft 24, 24' adjacent each of its ends for training thereabout of forward and rearward, transversely extending sprocket chains 26, 27. Each of said chains 26, 27 may be provided in their upper and lower courses with turnbuckles 28 for tension control purposes. Pattern plate 23' is suitably connected to the upper course of chain 26 (Figures 14 and 17) as by means of an ear 29 depending from said plate and being secured, as by a bolt 30, to said chain 26. Pattern plate 23' is engaged to the lower course of chain 26 by means of an arm 31 welded to the under surface of plate 23 and being bolted, as at 32, to said chain 26; with said arm 31 at its lower end being secured to the outer end of a piston 33 of a fluid cylinder 34 mounted within housing H and directed crosswise thereof (Figure 15). It will thus be seen that upon the admission of fluid to cylinder 34 for effecting outward movement of piston 33 pattern plate 23' will be caused to slide outwardly with the lower course of chain 26 being carried in such direction so that plate 23 will be correspondingly driven in the opposite direction for plate-opening relationship. To facilitate the smooth, sliding travel of plate 23, 23' between their limits of movement there is suitably mounted within housing H and on the forward and rearward walls thereof a multiplicity of rollers 35.

On the inner face of one side wall of houssing H for triggering by the outer edge of pattern plate 23 is an impulse switch I-2; while disposed within said housing for engagement by a switch actuator lug 36 carried on said plate 23 is a toggle switch TS-2 of the double throw type.

With reference being made primarily to Figure 1, it may be noted that the combined width of pattern or collector plates 23, 23', when in closed condition, is substantially equivalent to the width of the load to be stacked and that said pattern plates 23, 23' are longitudinally aligned with ram plate 10 so that units delivered thereby from conveyor C will be snugly received thereon. Mounted on the upper surface of housing H adjacent the side edges defining the pattern plate opening are rollers 37 which serve as lateral guides or supports for the units delivered to pattern plates 23, 23' by ram plate 10.

Disposed within elevator well 2 for vertical reciprocal movement therein is an elevator 40 having a flat pallet supporting upper surface and depending, rigidifying side skirts 41, 41'; the longitudinal extent of elevator 40 being less than the length of pallets supported thereon, whereby the latter will project beyond the forward edge of said elevator 40 so that when fully loaded the same will be engaged by a powered roller 42 which extends transversely across the lower forward portion of discharge opening 2' of elevator well 2; the ends of said roller 42 being journaled in the side walls of elevator well 2 and on one projecting end being drivenly connected to a small, continuously running motor 43 mounted on the exterior face of one side wall of the elevator well 2. Forwardly of powered roller 42 is a downwardly and forwardly inclined discharge conveyor 44, which may desirably be of multiple unit construction.

Disposed on either side of elevator well 2 and, preferably, received within vertically disposed channel-formed recesses 45, 45' are elevator fluid cylinders 46, 46', respectively, each having a piston 47 which at its upper end is provided with a clevis-type mounting 48 for a sprocket 48' about which is trained a chain 49. One end of each chain 49 is fixed to a bracket 50 on the inner face of the proximate channel flange, while the other end is secured to a bracket 51 bolted at approximately the midpoint of the adjacent skirt 41, 41', as the case may be, of elevator 40. Extending transversely between, and journaled at its ends within, the elevator skirts 41, 41', is a cross rod 52, on the outer projecting ends of which are keyed or otherwise mounted pinions 53 for meshing engagement with vertically disposed racks 54 extending from the bottom to the top of elevator well 2. Said racks 54 are located spacedly forwardly of the adjacent elevator cylinder 46, 46' with their serations being presented forwardly and said racks being suitably secured on their rearward vertical surface to the outer face of the forward flange of an inwardly opening channel 55, 55' fixed to the elevator side walls for forming a guideway through which idler rollers 56 mounted on the exterior of the adjacent elevator skirt 41, 41' move during elevator travel so as to stabilize same against undesired deviation from the vertical. Thus, by rack and pinions, as well as by rollered guides, elevator 40 is maintained reliably in vertical disposition for ascent and descent in its intended path of vertical movement.

Elevator 40 is provided in its upper surface with a pair of spaced apart openings 57 for partial projection therethrough of idler rollers 58 rotatably mounted upon short shafts journaled in the arms of fork-type supports 59 disposed at the bottom of machine A so that when elevator 40 is in lowered position the said rollers 58 will extend through openings 57 to engage the under surface of the pallet disposed on elevator 40 so as to facilitate the movement of the same therefrom. In this connection it should be noted that the powered roller 42 cooperates with said idler rollers 58 for expediting the movement of a loaded pallet from elevator 40; it being recognized that normally the load upon the pallet will be of substantial weight so that there does exist the need for overcoming the friction which would exist between the pallet and elevator 40.

Carried on elevator side skirt 41 is an impulse switch I-3 with its arm projecting laterally toward the adjacent side wall so as to be triggered successively on downward travel only of elevator 40 by trip lugs or switch actuators 60 mounted on the adjacent side wall of elevator well 2 and being arranged vertically at predetermined spaced intervals. As will be discussed more fully hereinbelow, elevator 40 in its downward travel will be caused to stop consequent to each triggering of impulse switch I-3 so that, accordingly, the distance between said trip lug 60 will determine the extent of travel of elevator 40 between each stoppage point. These increments of travel of elevator 40 will, of course, be predetermined by the height of the particular unit being stacked upon pallet *p* so that after each tier of such units is deposited upon pallet *p* elevator 40 will be caused to descend a sufficient distance so as to remove its uppermost tier of units from interference with pattern plates 23, 23' whereby the latter may be, unimpededly, returned to closed condition for receiving thereon the units comprising the next tier to be loaded. Thus, if units of relative height are being stacked on pallet *p*, it is obvious that the distance between trip lug 60 will have to be commensurately greater and, similarly, if the units are relatively shallow the distance between such trip lugs 60 may be correspondingly shortened. Although the invention as described herein would appear to suggest that machine A is adapted only for use with a unit of particular height, it should be understood that means such as set forth in the copending application of Frank W. Fenton, Serial No. 571,058, filed March 12, 1956 upon a Pallet Unloading Machine, could be readily utilized for the purpose of permitting simply effected adjustment of the distance between trip lugs 60 so as to cause elevator 40 to travel between stoppage points a distance related to the height of whatever particular unit is at that time being handled by machine A. For purposes of simplicity only, the operation of trip lugs 60 will be described, but it must be recognized that the same could be easily adjustably positioned so that elevator 40 could make as few or as many stops between its upper and lower limits as the height of the units may require.

Mounted on one side wall of elevator well 2 adjacent its upper end, and hence, immediately below housing H, is a normally closed limit switch LS–2 adapted for engagement by a projection 61 on elevator 40 when the latter reaches its upper limit of travel for the purpose of opening said switch to terminate the ascent of elevator 40.

When elevator 40 is in lowered position, as shown in Figure 18, the same will be disposed with respect to opening 4 in dividing wall 5 for receiving an empty pallet *p* from pallet chamber 3, as by means of a pallet ejector unit, generally indicated at E, which will now be described: Disposed at the bottom of elevator well 2, beneath elevator 40 when in lowered position, is a fluid cylinder 62 presented longitudinally of machine A of a substantial length to provide a relatively extensive stroke to its piston 63 which will be moved reciprocally forwardly and rearwardly from the rearward end of said cylinder 62. Piston 63 at its rearward or outer extreme portion mounts a pallet-pusher member 64 having a sleeve-forming portion 64' for slidable extension about a guide rod 65 which is fixed at one of its ends to the rearward wall of chamber 3 and at its forward end to a plate 66 secured to the rearward end of cllinder 62; said guide rod 65 being in axial parallel relation with piston 63. Upon rearward travel of piston 63 pallet-pusher 64 will be delivered to a point adjacent the rearward wall of pallet chamber 3 and hence poised for engaging an empty pallet *p* and shoving same forwardly, upon forward or return travel of piston 63, for impelling same through opening 4 and on to elevator 40. Except at the commencement of operation of machine A, whenever an empty pallet *p* is delivered through opening 4 onto elevator 40, there will normally be a fully loaded pallet disposed thereon so that the movement of the empty pallet *p* pursuant to forward travel of pallet pusher 64 will drive the loaded pallet from elevator 40 for discharge.

Disposed within the lower portion of pallet chamber 3 on opposite sides of guide rod 65 are vertically presented fluid cylinders 67, 67' having pistons 68, 68' respectively, which at their upper ends mount narrow, horizontally disposed pallet support plates 69, 69', respectively. Pivotally engaged to one edge portion of each pallet support plate 69, 69' is the upper end of a downwardly and outwardly extending link 70 which is slideably connected in its lower portion to the lower end of a rocker arm 71; the upper end of said rocker arm 71 is fixed centrally to a longitudinally extending shaft 72 journaled in bearing brackets 73 supported upon the adjacent wall surface of pallet chamber 3. Secured at their lower ends on each shaft 72 for swinging movement consequent to rotation thereof is a pair of spaced pallet dogs 74, 74' which at their upper ends are each provided with a flat, normally inwardly projecting pallet-engaging member 75 for supporting a stack of empty pallets *p*. Each link 70 has an encircling compression spring 76 which abuts against the upper surface of the lower end of arms 71 for biasing the same downwardly whereby the associated pallet dogs 74, 74' are urged inwardly at their upper ends for presenting members 75 in pallet supporting position (as shown in full lines in Figure 20). It will thus be seen with reference to Figure 20 that when pistons 68, 68' of cylinders 67, 67' are elevated through fluid pressure, the related links 70 will be carried upwardly and thus allow the associated rocker arm 71 to be rocked upwardly at its lower end, thereby causing the related shaft 72 to rotate with dogs 74, 74' being thereby swung outwardly (see dotted lines Figure 20) away from pallet engaging position so that the stack of pallets *p* will be freed for reception upon, and support by, pallet support plates 69, 69' on pistons 68, 68'. Upon subsequent lowering of pistons 68, 68' the stack of empty pallets *p* will be moved downwardly, as pallet dogs 74, 74', during such movement, are being returningly rocked inwardly so that pallet engaging members 75 will again be restored to pallet supporting position in predetermined timed sequence to the downward travel of pistons 68, 68' whereby the same will engage the under surface of the pallet previously second to the bottom of the stack and thus support the remaining portion of the stack thereabove. Pallet support plates 69, 69' thus retain and carry the erstwhile bottommost pallet *p* to the lower position of said pistons 68, 68' whereat said pallet *p* will be positioned for engagement by pallet pusher 64 for delivery to elevator 40.

Hingedly engaged to pallet support plate 69' is the upper end of an upper toggle link 77 which at its lower end is pivotally engaged to a cooperating lower toggle link 78; said latter being swingably mounted at its lower end to a lug 79 located at the base of chamber 3. Fixed to the lower end of toggle link 78 for movement therewith is a switch actuating arm 80 for engaging a normally closed limit switch LS–3 disposed proximate the base of cylinder 67'. Suitably positioned in the lower portion of chamber 3 is a normally closed limit switch LS–5 for engagement by lower toggle link 78 when piston 68' is at the lower limit of its movement whereby said switch LS–5 will be opened. Although the electrical connections of switches LS–3 and LS–5 will be described more fully hereinbelow, it may be noted that the downward travel of pistons 68, 68' will be terminated by engagement of lower link 78 with limit switch LS–5 for thereby causing the same to be opened, while correspondingly the upper limit of travel of said pistons 68, 68' will be determined by opening of switch LS–3 by actuating arm 80; said latter hence engaging switch LS–3 when toggle links 77, 78 are in extended relationship (as shown in dotted lines in Figure 18).

Mounted on the rear wall of chamber 3 is a normally closed limit switch LS–4 disposed for contact by pallet pusher 64 on rearward travel thereof for terminating such travel by opening of the circuit through said switch. Mounted within the lower portion of elevator well 2, proximate the rearward end of cylinder 62, is a normally closed limit switch LS–1 for contact by a lug 81 carried on pallet pusher 64 to thereby limit forward travel of said pusher.

Substantially bridging the distance between pallet support plates 69, 69' when in lowered position and elevator 40, for facilitating sliding movement of an empty pallet *p* from chamber 3 onto elevator 40 is a pair of laterally spaced apart, slide members 82. On the inner walls of pallet chamber 3 above opening 4 are presented pallet guide members 83 for expediting unimpeded downward movement of pallet p from a supply stack.

An elevator interlock switch LS–7 is disposed suitably within compartment 6 for engagement by a pump solenoid for purposes and in a manner to be described.

*Electrical system*

With reference now being made to the wiring diagram shown in Figure 23, impulse switches I–1–, I–2 and I–3 are in parallel, with their load side connected by a conductor 300 to a solenoid or electro-magnet 301 of a stepping switch, designated generally at 302; there being the customary pawl and ratchet wheel (not shown) for operatively connecting the armature of solenoid 301 with a switch wiper arm 304 for sequentially engaging stationary terminals or contacts C–1, C–2, C–3, C–4 etc., preferably arranged in a semi-circular bank. Solenoid 301 is in circuit by a lead 305 to the positive terminal of a rectifier 131 of the full wave or bridge type for converting the alternating current of the source to direct current for the operation of a direct current control circuit, as broadly indicated at DC. The opposite or line side of impulse switches I–1, I–2 and I–3 are connected by a conductor 306 to the negative side of rectifier 131 and through a connecting lead 307 to wiper arm 304.

Switch terminals C–1, C–2 and C–3 (as well as C–6, C–7 and C–8; C–11, C–12, and C–13 et seq.) are connected to the solenoid coils of relay switches 308, 309 and 310 for operation thereof through the following circuit: Said sets of three consecutive switch terminals have a common lead 311 to toggle switch TS–1 being, as stated, of the double throw type, for selectively connecting said lead 311 to either a conductor 312 which is directly connected to relay 310 or to an intermediate lead 313 which is connected to reversing switch TS–2 also of the double throw type. Said latter switch TS–2 selectively connects intermediate 313 with either a conductor 314 which is directly connected to relay switch 309 or to a lead 315; said latter being connected to relay switch 308. Disposed within said lead 315, in series, are the four interlock switches S–1, S–2, S–3, and S–4, which are paralleled by normally closed limit switch LS–6 in a conductor 316.

Switch terminals C–4, C–9, C–14, et seq. of switch 302 are connected by a lead 317 to the solenoid coil of a relay switch 318; there being presented within lead 317 elevator interlock switch LS–7, which is normally closed. Switch terminals C–5, C–10, C–15, et seq. of switch 302 are connected by a lead 319 which is directly connected to the solenoid coil of a relay switch 320.

In tandem with the bank or stepping switch 302 is a second bank or second stepping switch indicated generally at R of like physical characteristics as switch 302 and having arranged in a semi-circular manner for progressive contact by its wiper arm 321 switch terminals D–1, D–2, D–3 et seq. Wiper arm 321 of switch R is mounted on a common shaft indicated at 322 with wiper arm 304 of stepping switch 302, so that said wiper arms 304 and 321 will step simultaneously through identical increments of movement with the result that as wiper arm 304 on stepping switch 302 moves from switch terminal C–1 to C–2, wiper arm 321 will correspondingly move from its associated switch terminals D–1 to D–2, etc. etc.

Switch terminals D–1, D–2, D–3 and D–4 of stepping switch R are connected to the solenoid coils of relay switches 323 and 324 through the following circuit: A common lead 325 for said four switch terminals connects same with normally closed limit switch LS–1 which is presented for selectively connecting lead 325 with either a conductor 326 directly engaged to the solenoid coil of relay switch 324 or a lead 327 which is connected through normally closed limit switch LS–2 to relay 323. Switch terminal D–5 is opened or unconnected, while terminals D–6 and D–7 are connected by a common lead 328 through normally closed limit switch LS–3 to the solenoid coil of relay switch 329. Switch terminals D–8, D–9, D–10 and D–11 are connected through a common lead 330 to the solenoid coil of relay switch 331 with normally closed limit switch LS–4 being located within lead 330. Switch terminals D–12 and D–13 have a common connection through lead 332 and through normally closed limit switch LS–5 are connected to the solenoid coil of a relay switch 333.

The above described switch terminals, namely, D–1 through D–13 are the only ones which are utilized on stepping switch R, that is, of course, with exception of switch terminal D–5 which is open, so that upon movement of wiper arm 321 through the arc defined by said terminals the cycle of operation of control thereby will have been completed. Thus, as wiper arm 321 is moved through rotation of common shaft 322 through the remaining portion of the stepping switch R no operation will result therefrom. As will be discussed below, each group of five contacts on stepping switch 302 will determine a cycle of operation with each such cycle corresponding to the disposition of a tier of units upon the pallet to be loaded. Consequently, stepping switch 302 will have as many groups of five related contacts as there are to be tiers of units disposed upon the pallet, all as appears in detail below.

The load side of relay switches 308, 309, 310, 318, 320, 323, 324, 331, 329, and 333 are respectively connected to solenoids 335 through 344 for actuation of the valves of pumps P–1 and P–2 in the manner and for the purposes to be described. Said solenoids 335 through 344 are connected by a conductor 345 to a source of alternating current through a motor starter and disconnect switch 346. The line side of relay switches 308, 309, 310, 318, 320, 323, 324, 329, 331 and 333 have a common connection to lead 347 to the alternating current source, while the other sides of the solenoid coils of said relay switches have a common connection, namely, lead 348, to conductor 305.

The operation of the circuit will now be described: Assuming toggle switch TS–1 closes the circuit through leads 313 and 315; with pattern plates 23, 23' in closed condition and elevator 40 at its upper limit of travel, disposed immediately beneath said pattern plates, with toggle switch TS–2 being held by said plates 23, 23' so as to close the circuit between leads 311 and 313, and with the units to be stacked presented on conveyor C before ram plate 10 thereby effecting closure of interlock switches S–1, S–2, S–3 and S–4 the connection will be completed of switch terminals C–1, C–2 and C–3 through lead 311 to the solenoid coil of relay switch 308. By the foregoing condition pump solenoid 335 will be energized to cause fluid to be delivered to fluid cylinder 8 for effecting forward travel of ram plate 10, thereby impelling the units on conveyor C therefrom and onto pattern plates 23, 23' into the position shown in Figure 1. The forward movement of ram plate 10 will continue until rearward block 19' engages toggle switch TS–1 to cause same to open the circuit between leads 313 and 315 and to close the circuit between leads 313 and 314, whereby pump solenoid 336 is energized with consequent fluid operation for effecting return or withdrawing movement of ram plate 10. It will be noted that as the units are transferred from conveyor C to pattern plates 23, 23' interlock switches S–1, S–2, S–3 and S–4 will through the bias of their associated springs become open. However, the circuit to relay switch 308 will remain closed through the normally closed limit switch LS–6 to allow the operative stroke of ram plate 10 to continue. The return movement of ram plate 10 will be terminated by engagement of toggle switch TS–1 by forward block 19, causing said switch to swing into circuit-closing position between leads 313 and 315, preparatory to the next operative stroke of ram plate 10; it being noted that limit switch LS-6 will be opened substantially simultaneously with such actuation of toggle switch TS-1 as end member 16 reaches its rearward point of travel so that the circuit will at that juncture be open to relay switch 308 as the paralleled switches in lead 315 and 316 are open. Impulse switch I-1 will be triggered by lug 20 when end member 16 reaches its rearward limit of movement whereby a pulse is applied to stepping switch solenoid 301 for moving wiper arm 302 from switch terminal C-1 to C-2 whereupon the above described, reciprocal action of ram plate 10 will be repeated since terminals C-1 and C-2 have a common connection. However, such action will not commence until all four interlock switches S-1, S-2, S-3, S-4 have been closed by units disposed on conveyor C, so that the circuit to relay switch 308 is closed. As ram plate 10 moves forwardly, limit switch LS-6 will be freed from contact with lug 21 and hence, permit it to return to normal circuit-closed condition. Thus, ram plate 10 will cause thereby a second row of units to be placed on pattern plates 23, 23' which will shovingly engage the first or front row already deposited thereon and drive same forwardly. Through the operation described, impulse switch I-1 will again be triggered resulting in wiper arm 304 moving to switch terminal C-3 whereupon the unit impelling movement of ram plate 10 will again be repeated for placing the third or rear row of units of the particular tier being formed upon pattern plates 23, 23', which will hence cause forward sliding of the two rows previously disposed thereon into full forward position, thereby substantially covering the normally exposed upper surface of pattern plates 23, 23'.

It should be specifically pointed out that the common connection of the three switch terminals, as C-1, C-2 and C-3 for bringing about three successive operative strokes of ram plate 10 to cause delivery of three rows of units to pattern plates 23, 23' to form a single tier is solely for purposes of illustration, as a tier may most apparently be comprised of less or more than three rows and with the number of units per row varying. Hence, accordingly, that number of switch terminals requisite for the indicated number of row-forming ram plate strokes, will be properly connected to relay switch 308. Also the number of interlock switches as S-1, S-2, S-3, and S-4 may be varied commensurate with the size of the units to be stacked; the criterion being that all such interlock switches be closed by disposition thereon of the number of units constituting a row before ram plate 10 will move forwardly. Thus, conceivably with but a single unit per row, a single interlock switch could be used.

Upon triggering of impulse switch I-1 on the rearward travel of the third stroke of ram plate 10, wiper arm 304 is caused to move as switch terminal C-4 thereby causing the circuit to be closed through lead 317 to pump solenoid 338, resulting in fluid flow to cylinder 34 for effecting outward lateral, opening movement of pattern plates 23, 23' so that the three-row of tier of units disposed thereon will be freed to descend, through gravity, on to elevator 40. Normally closed limit switch LS-7 will remain closed as the same will only be opened during the ascent of elevator 40, as described below. The limit of outward or opening movement of pattern plates 23, 23' is determined by engagement of plate 23 with impulse switch I-2, which latter is triggered to cause a current pulse for energizing stepping switch solenoid 301 with consequent movement of wiper arm 304 to switch terminal C-5 for energizing, through lead 319, pump solenoid 339, whereby fluid flow to the upper ends of elevators fluid cylinders 46, 46' is brought about for descent of said elevator 40. The downward travel of elevator 40 is terminated by triggering of impulse switch I-3, carried upon elevator 40, by the uppermost trip lug 60. Resulting therefrom, wiper arm 304 is swung into engagement with switch terminal C-6 which, as may be readily seen, corresponds to switch terminal C-1, as it has the same connection, and thereupon the cycle just described will be repeated, as wiper arm 304 is excessively brought into contact with terminals C-7, C-8, C-9, and similarly, through each succeeding group of five switch terminals. Thus, it will be seen that the switch terminals of stepping switch 302 are so arranged and connected that each succeeding group of five terminals represents the cycle of operation for effecting the delivery of a tier of units to pattern or collector plates 23, 23', the opening of said plates for depositing the tier so formed upon elevator 40, and the travel of elevator 40 downwardly a distance requisite for removing the deposited tier below pattern plates 23, 23' and the closing of such plates preparatory to receiving the units forming the next tier. This operation will continue until elevator 40 has reached its lower limit of travel whereat its supported pallet will be fully loaded. The number of tiers to be deposited upon the pallet will of course be determined by the nature of the units being so stacked. But, for each tier there will be a predetermined number of switch terminals to effect the operation and that number of groups of terminals corresponding to the tiers upon the pallet. After the pallet is thus loaded the wiper arm 304 will be returned to initial or switch terminal C-1 for recommencement of the total loading operation. As brought out hereinabove, it is quite possible that the units to be stacked may be of such dimension that only a single row will constitute a full tier or two rows and, accordingly, a single or double action of ram plate 10 will be adequate for effecting the loading of a tier rather than three strokes, as set forth hereinabove for illustrative purposes. In this event, it is understandable that those switch terminals which control the operation of the ram plate will be connected in common, whether there will be two, four, or merely one.

On the outward or opening movement of pattern plates 23, 23' toggle switch TS-2 will be engaged and thereby caused to connect leads 311 and 312 with consequent disconnection of lead 311 from lead 313 so as to assure inoperation of ram plate 10 while pattern plates 23, 23' are in open condition so that undesired forward movement of units will be prevented during such interval. However, as switch wiper arm 304 is moved to engage switch terminals C-6, C-11, as the case may be, for each succeeding cycle, pump solenoid 337 will be energized as the circuit is closed through toggle switch TS-2 as above described so that fluid will be delivered to cylinder 34 for effecting closing movement of pattern plates 23, 23'; upon each such closing movement of said plates toggle switch TS-2 will be swung so as to open the circuit between leads 311 and 312 and close the circuit between leads 311 and 313 to establish the condition precedent for the operation of ram plate 10.

While wiper arm 304 of stepping switch 302 is being moved through the switch terminals C-1, C-2, C-3, and C-4, wiper arm 321 of stepping switch R will be simultaneously contacting corresponding switch terminals D-1, D-2, D-3, and D-4 which, as described, are connected to a common lead 325 in circuit with the solenoid coils of relay switches 323 and 324. With piston 63 of ejector E being in its retracted or rearward position, normally closed limit switch LS-1 will connect lead 325 with lead 326 so that as wiper arm 321 closes the circuit through switch terminals D-1 through D-4, pump solenoid 341 will be energized for causing fluid flow with respect to cylinder 62 to move piston 63 forwardly until limit switch LS-1 is engaged by lug 78 and thereby caused to close the circuit between leads 325 and 327, resulting in the energization of pump solenoid 340, whereby fluid is delivered to the lower ends of elevator cylinders 46, 46' for raising elevator 40 from its lower position to its upper limit preparatory to receiving the first tier of units of the next load to be stacked; said elevator having received thereon by forward movement of piston 63 an empty pallet p. The upward travel of elevator 40 with its empty pallet is terminated by engagement of limit switch LS-2 by lug 78, consequent to which said switch is opened. It should be particularly noted that during ascent of elevator 40 pattern plates 23, 23' will be prevented from opening as limit switch LS-7 is held open as long as the elevator is rising, pump solenoid 340 is energized (see Figures 24, 25); said limit switch LS-7 being located adjacent pump P-2 for circuit opening contact by the armature of solenoid 339 when solenoid 340 is energized.

As wiper arm 304 moves to switch terminal C-5 of stepping switch 302 to effect downward movement of elevator 40 as above described, wiper arm 321 of switch R will move to switch terminal D-5 which as indicated is open so that at this juncture no action is being controlled by said switch. As switch terminals C-6 and C-7 of said stepping switch 304 are engaged to effect movement of ram plate 10, switch terminals D-6 and D-7 of stepping switch R will be simultaneously engaged with the same causing energization by means of switch 329 of pump solenoid 343 to thereby cause upward movement of pistons 68, 68' of pallet dispenser cylinders 67, 67' for upward movement of the pallet stack in chamber 3 preparatory to freeing the bottommost one as indicated above. This upward movement of pallet dispenser cylinders 67, 67' will continue until limit switch LS-3 is opened by engagement with arm 80, with wiper arm 321 being brought into engagement with switch terminals D-8, D-9, D-10 and D-11, all of which have a common connection, namely, 330. Pump solenoids 342 will be energized by means of relay switch 331 for effecting retraction or rearward movement of piston 63 for returning pallet ejector E into position for its next operative stroke; such rearward travel of piston 63 will be terminated by opening of limit switch LS-4. It will thus be seen that the stack of empty pallets p will be maintained in an elevated position by the pallet dispenser system during the rearward travel of the pallet ejector member so as to prevent any untoward interference therewith. Wiper arm 321 will next be moved into engagement with switch terminals D-12, and D-13, consequent to movement of wiper arm 304 and will thereby cause energization of pump solenoid 344 by means of relay switch 333, so as to effect downward movement of pistons 68, 68' on pallet dispenser cylinders 67, 67' for delivering a pallet p into position with respect to piston 63 for delivery thereof upon the next forward stroke of said pallet ejector system. Said downward travel of pistons 68, 68' of pallet dispenser cylinder 67, 67' will be terminated by opening of limit switch LS-5 in the manner above described. It will thus be seen that switch terminals D-1 to D-13 of stepping switch R constitute the cycle of operation effected by said switch and hence a repetition of said cycle will not be initiated until wiper arm 304 of stepping switch 302 has been returned to switch terminal C-1. Therefore, any switch terminals of stepping switch R subsequent to terminal D-13 are open and have no electrical character.

A pushbutton for clearing the system may be provided in parallel with impulse switch I-1, I-2, I-3, as at k.

*Fluid operating system*

In Figure 24, there is shown a schematic representation of the fluid system incorporated in machine A. Although this system is illustrated as being hydraulic, it is obvious that the same could be readily adapted for pneumatic operation. Drivingly connected to prime mover M are pumps P-1, P-2, and P-3 (Figure 21), each of which is suitable in communication through supply lines with a source of operating fluid contained within a reservoir or tank T. Pump P-1 incorporates a pair of pump valves 349, 350; while pump P-2 contains three valves, 351, 352, and 353. The structure associated with each of said five pump valves is substantially identical, as the cylinders respectively operated therefrom are of the double-acting type, whereby each valve includes four ports 354, 354' and 355, 355' for flow of fluid to and from the related cylinder or cylinders, and the customary two ports for fluid supply from the related pump and for return flow to reservoir T; said latter ports being indicated at 356, 357, respectively.

Valves 349 and 350 of pump P-1 are respectively operatively connected with ram plate cylinder 8 and pattern or collector plate cylinder 34; while valves 351, 352, and 353 of pump P-3 are connected similarly controllingly with elevator cylinders 46, 46', pallet ejector cylinder 62, and pallet dispenser cylinders 67, 67', respectively.

Provided for operation within each pump valve 349, 350, 351, 352, and 353, is a valve rod 358 carrying a pair of spaced apart valve cylinders 359, 360, for respective coaction with ports 356, 354, 354' and 357, 355, 355', in the well known manner. Each valve rod 358 is pivotally engaged at its outer end to the inner end of a connecting link 361, which at its other end is swingably engaged to a cross bar 362; said cross bar 362 being hinged at its mid-point upon a frame member 363 with the point of engagement with said connecting link 361 with said bar 362 being between the pivot point of the latter and one of its ends. Each cross bar 362 mounts at its opposite extremities armatures 364, 365 for the related solenoids.

Thus, it will be noted that upon energization of the pump solenoids 335 through 344, as above described, the associated armature 364 or 365, as the case may be, will be attracted causing the related cross bar 362 to be swung about its pivot point with the opposite armature being withdrawn from its related solenoid and the linkage effecting that movement of the related valve rod 358 for establishing a path of fluid flow for the intended operation.

The operation of limit switch LS-7 may best be understood from Figures 24 and 25, as the same is suitably mounted for engagement by cross bar 362 of valve 351 when solenoid 340 is energized. Switch LS-7 is normally closed, but will be held open throughout the interval of energization of solenoid 340 or during the upward travel of elevator 40 so as to prevent opening of pattern plates 23, 23'. Upon de-energization of solenoid 340, upon opening of limit switch LS-2 (when elevator 40 has reached its upper limit of movement) said switch LS-7 will be returned to circuit closing condition.

*Pattern forming system*

In order that the units to be stacked on pallet p to form, what is termed in the industry, a "locked load," it is requisite that the individual units presented to ram plate 10 be in such attitude to develop a predetermined pattern or inter-relationship within each tier. In most instances, such locked loads are comprised of tiers of alternating patterns, but it is, of course, apparent that, if desired, there may be more than two different tier patterns in the same load. However, the alternation of pattern designs will customarily provide the inter-locking necessary for load stability. The particular patterns to be formed for any load will expectedly depend upon the size and character of the units involved. For purposes of illustrating the operation of the pattern-forming system of the present invention the units will be considered as of non-cubic character, but as stated hereinabove, it is to be recognized that machine A is capable of handling units of varying sizes and shapes, since the modifications in operation for accommodation of such varying types of units will become quite apparent to those skilled in the art from a study of this disclosure.

In essence, the pattern-determining means of the present invention is adapted to selectively turn units as the same are delivered to conveyor C from the unit-feeding conveyor D whereby certain units for each tier will be presented with their longitudinal axes normal to that of the remaining ones.

Referring now to Figures 3 to 7 inclusive, it will be seen that unit-feeding conveyor D comprises customary rollers 400 journaled between parallel side plates 401, 401' disposed in axial perpendicular relationship to conveyor C to which it is suitably secured by frame members proximate the outer end of said conveyor C, preferably, on the rearward side thereof. Thus, conveyor D leads from a supply source, assembly line, or the like. Spaced a relatively short distance from the juncture between said conveyors C, D and mounted respectively upon, for projection above, side plates 401, 401' is an electric eye having associated photoelectric cell and relay 402 and its light source 403, so that units being advanced along conveyor D to conveyor C will interrupt the beam of light impinging upon said eye 402 from its light source and thereby actuate a control circuit to be described below. Rollers 400 are powered by frictional engagement with endless belts 404 trained about sheaves 405, 405' carried upon an idler shaft 406 and a driven shaft 407, respectively, also journaled in said side plates 401, 401'. Driven shaft 407 mounts at one projecting end a beveled gear 408 engaging a gear 409 carried on one end of a shaft 410, which is axially normal to driven shaft 407 and journaled at its ends between the side plates 411, 411' of conveyor C at the outer ends thereof. Shaft 410 at its opposite end mounts a pinion 412 meshing with a driving gear 413 keyed or otherwise mounted on the end of the drive shaft 414 of a continuously running hydraulic motor 415 operated by pump P-3. Shaft 410, outwardly of gear 412, also mounts a beveled gear 416 meshing with a like gear 417 on the end of a driven shaft 418, which latter is journaled in spaced apart frame members 419, 419' extending forwardly from conveyor side plate 411 in planar-wise perpendicular relationship thereto, with shaft 418 being thus axially normally disposed to shaft 410. Secured on shaft 410 intermediate side plates 411, 411' is a drum 420, about which is trained one end portion of an endless belt 421, the opposite end portion being disposed about a drum 420' on an idler shaft 422 in conveyor C; said belt 421 being in suitably threaded relationship to the rollers of conveyor C for the rotation of the same. Through the means just described, hydraulic motor 415 provides the power for driving the belts of both conveyors C, D, as well as for effecting constant rotation of shaft 418.

With reference to Figure 4, it will be seen that the rollers of conveyors C, D adjacent their point of juncture are substantially aligned surface-wise so that normally units being advanced from conveyor D to conveyor C will be swung through an arc of 90 degrees as the same are influenced by the axis of rotation of the rollers of said conveyors. Thus, as the forward portion of a unit is received on conveyor C, it will be subjected to the rotation of the rollers thereof, while its rearward portion is subjected to the rotation of the rollers of conveyor D, so that the unit will swing as its longitudinal axis progressively seeks coincidence with the direction of travel of conveyor C. For assisting the turning movement of the units, there is presented a horizontally disposed, freely rotatable roller 423 on side plate 411' immediately adjacent the forward edge of side plate 401.

In order to selectedly control such swinging of the units so that the same may be presented to ram plate 10 with their longitudinal axes normal to the direction of travel of conveyor C, reference will now be made to structure operatively connected with shaft 418. Disposed centrally on such shaft 418 is a pulley or sheave 424 about which is trained one end portion of a V-belt 425, the other end of which is engaged about a pulley 426 carried upon a shaft 427 journaled at its ends in frame members 419, 419' forwardly and upwardly of shaft 418. Mounted on shaft 427 are spaced apart sprockets 428, 428' about which are engaged drive chains 429, 429', respectively; said latter extending rearwardly through suitable openings in side plate 411 and between rollers of conveyor C for engagement at their rearward ends about sprockets 430, 430', respectively. Said chains 429, 429' will be normally presented slightly beneath the rollers of conveyor C for avoidance of any untoward contact with units being received on conveyor C. Sprockets 430, 430' are rotatably mounted upon a cross rod 431 supported at its ends in enlarged, bearing-forming openings 432 in the upper ends of transversely spaced apart vertical members 433, supported as by brackets 434 from the machine frame (Figure 5). Cross rod 431 is engaged to the upper end of a toggle link 435 which at its lower end is pivotally attached, as by a pivot pin 436 to a cooperating link 437, with the latter being hinged at its lower end to an arm 438 fixed on the adjacent portion of the machine frame (Figure 4). Secured to pivot pin 436 is the outer end of an armature 439 of a solenoid 440, whereby upon energization of the latter with consequent attraction of armature 439, pivot pin 436 will be pulled forwardly causing toggle links 436 and 437 to be extended resulting in upward movement of cross rod 431 within its bearing openings 432 to thereby effect elevation of the rearward end of chains 429, 429' above the adjacent rollers of conveyor C, as indicated in dotted lines in Figure 4, for receiving units advanced from conveyor D. Upon de-energization of solenoid 440, chains 429, 429' will be restored to lowered position and hence, out of the path of units being conveyed.

Provided for extension rearwardly over the upper edge of conveyor side plate 411, and above the rollers of conveyor C, is the upper end of a switch actuator 441, rockably mounted for swinging movement between said rearward position and forwardly beyond said side plates 411. Said switch actuator 441 is biased by a spring 442 into rearward position for engagement by units being delivered to conveyor C from conveyor D; there being carried at the lower end of said actuator 441 a lug 443 for engaging a normally closed limit switch LS-8 when said switch actuator 441 is in forwardly rocked position, as indicated in dotted lines in Figure 4, for opening of the switch circuit.

Figure 26:
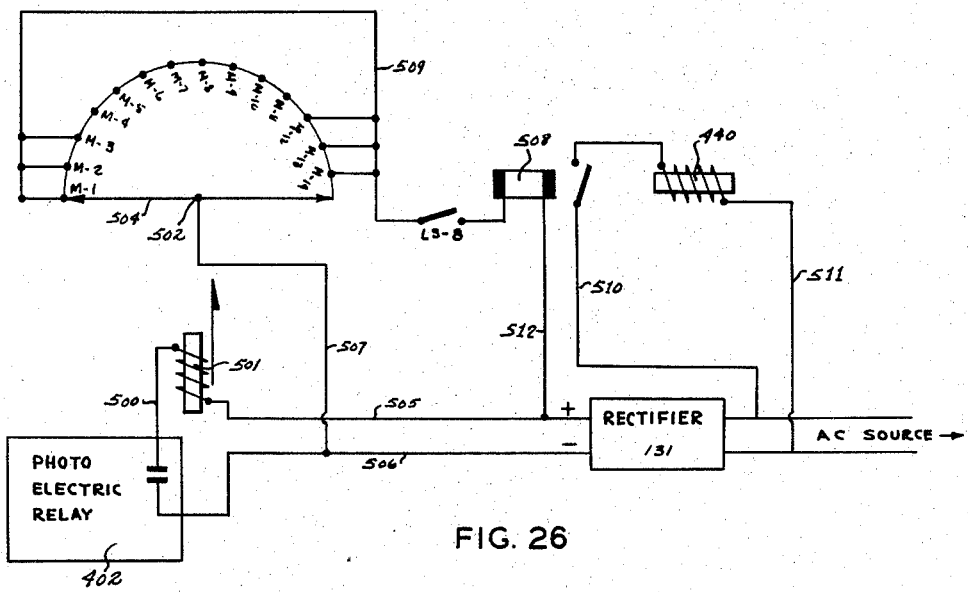
Figure 26 is a wiring diagram of the pattern-determining system.

With reference now being made to the wiring diagram shown in Figure 26, the external circuit contacts of electric eye 402 are connected by a lead 500 to a solenoid or electromagnet 501 of a stepping switch designated generally at 502; there being the customary pawl and ratchet wheel (not shown) for operatively connecting the armature of solenoid 501 with a wiper arm 504 for sequentially engaging stationary terminals or contacts M-1, M-2, M-3, etc., arranged preferably in the customary semi-circular bank. Solenoid 501 is in circuit by a lead 505 to the positive terminal of rectifier 131. The opposite or line side of the external contacts of electric eye 402 are connected by conductor 506 to the negative side of said rectifier 131, with a lead 507 connecting conductor 506 to wiper arm 504.

Switch terminals M-1, M-2, and M-3, as well as M-12, M-13, and M-14 are connected to the solenoid coil of a relay switch 508 through a common connection 509; with limit switch LS-8 being interposed in said lead 509. The load side of relay switch 508 is connected to solenoid 440. Solenoid 440 is connected by a lead 511 to the other side of the source of alternating current. The line side of relay switch 508 is connected by conductor 510 to the alternating current source, while the other side of the solenoid coil of said relay switch is connected by lead 512 to conductor 505.

Figure 27:
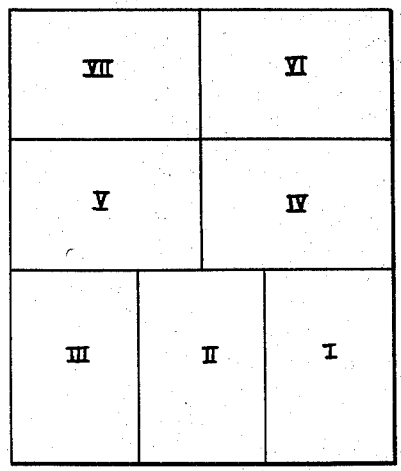
Figure 27 is a plan view of one type of unit pattern effected by the present invention.
Figure 28:
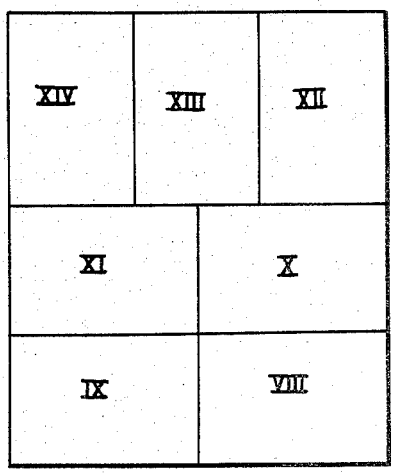
Figure 28 is a plan view of another type of unit pattern effected by the present invention.

Assuming that limit switch LS-8 is closed, solenoid 440 is de-energized with chains 429, 429' in lowered position the passage of a unit along conveyor D past electric eye 402 will cause a pulse of current to be delivered to solenoid 501 effecting movement of wiper arm 504 to switch terminal M-1. Thereupon solenoid 440 by means of relay switch 508 will be energized causing toggle links 435, 437 to be brought into extended position with chains 429, 429' being elevated above the adjacent rollers of conveyor C. Thus, unit I being advanced onto conveyor C will be received upon said chains 429, 429' and held thereby from engagement with the rollers. Since chains 429, 429' will, when elevated, incline slightly downwardly and forwardly the unit received thereon will move forwardly and into abutment against actuator 441 which under the impact will be rocked to cause lug 443 to engage limit switch LS-8 for opening thereof, resulting in the de-energization of solenoid 440 and consequent lowering of chains 429, 429', with the unit thereon being presented for influence by the rollers of conveyor C. Said unit will be thus moved along conveyor C with its longitudinal axis perpendicular to the direction of travel of said conveyor, as said unit was prevented by its reception upon chains 429, 429' from being turned by having its forward portion of one conveyor and rearward portion on the other, all as above described. The next succeeding unit II in passing electric eye 402 will similarly cause solenoid 440 to be energized with wiper arm 504 moving to switch terminal M–2 so that said next succeeding unit will likewise be delivered to ram plate 10 with its longitudinal axis normal to the direction of movement of conveyor C. In a like manner the following unit III will also be presented in such fashion. In conjunction with the basic operation of machine A, ram plate 10 will then deliver said units I, II, III onto pattern plates 23, 23', which units will constitute the first row in the tier being formed. Since the eight succeeding switch terminals on stepping switch 502 are open or unconnected, that is, terminals M–4 through M–11, inclusive, the succeeding eight units, namely, IV to XI, inclusive, delivered to conveyor C, will be turned so as to cause their longitudinal axes to coincide with the direction of travel of conveyor C. However, in this instance, the first two units of said group, namely, IV and V, will comprise the second row of the tier being formed, while the second pair, VI and VII, will form the third and last row; the third pair, VIII and IX, will constitute the first row of the next tier; with the fourth group of units, X and XI, forming the second row of such next tier. As the 12th unit, XII, passes electric eye 402, wiper arm 504 will be brought into engagement with switch terminal M–12, which will effect energization of solenoid 440, resulting in the operation of chains 429, 429' to prevent turning of this particular unit. Thus, it will be seen that as the arm 504 moves from switch terminal M–12 to M–14 and then around to M–1, M–2, and M–3, the six units corresponding thereto will be prevented from turning and hence, delivered to pattern plates 23, 23' in axially normal relationship to the preceding eight units delivered. The units corresponding to switch terminals M–12, M–13, M–14, that is, XII, XIII, and XIV, will form the third and last row of such next tier, while the succeeding three units will form the first row of the third tier. In Figures 27 and 28 there is shown the arrangement of units in the two tiers as formed with the numbers of such units corresponding to the like members of the switch terminals on stepping switch 504 whereby the locking relationship of the tiers will become all the more apparent. Thus, the tiers will alternate between the two patterns and provide reliable load stability.

In the particular arrangement shown there are seven units per tier. However, it is recognized that the connections on stepping switch 502 could be readily changed so as to effect any desired relationship of the units. Understandably, if desired, a machine might incorporate a plurality of such stepping switches and associated structure, each being capable of providing a different pattern so that the operator could preselect by actuation of a suitable control button a pattern requisite for the type units being handled.

*Unit stopping device*

Referring to Figures 8, 9, 10 and 29, it will be seen that machine A incorporates a barrier or stopping device indicated generally at 90 for units travelling along conveyor C to prevent same from interfering with ram plate 10 during the course of its reciprocal stroke.

Said stopping device 90 incorporates a pair of flat, U-shaped members 91, 91' having arms of different length and being mounted spacedly apart, at the upper extremities of their shorter arms, upon a rock shaft 92 journaled at its ends and extending tranversely between side plates 411, 411' of conveyor C at a point proximate housing 7. Said members 91, 91' at the upper extremities of their other or longer arms are interconnected by a cross bar 93, and are of such curvature that their bend portions will be disposed beneath the adjacent rollers of conveyor C, with their arms projecting upwardly therebetween. When members 91, 91' are in normal position their longer arms will extend upwardly above the rollers so as to present cross bar 93 within the path of the units being conveyed so as to serve as a barrier therefor. Engaged to cross bar 93 as by means of a depending ear 94 is the pivoted, upper end of a toggle link 95, the lower end of which is swingably engaged to a lower or cooperating toggle link 96, with the lower end of the latter being engaged as by a lug (not shown) fixed upon a rod 97 axially parallel with the direction of travel of conveyor C and disposed therebeneath. Rod 97 is suitably adapted for rotative movement and proximate its other end mounts a lug 98 to which is pivotally engaged the forward end of a connecting link 99. The other or rearward end of link 99 is secured to the lower end of a vertically presented rocker arm 100 disposed within housing 7. Rocker arm 100 is pivotally mounted substantially at its mid-point, for swingable movement in a vertical plane, on the inner face of side plate 411' (see Figure 29), with its head or upper end extending into the opening receiving ram plate 10. Engaged to the lower end of rocker arm 100 is a spring 101 attached at its other end to the adjacent side wall of housing 7 for biasing the lower end of rocker arm 102 rearwardly or within said housing 7 and consequently causing the upper portion to abut against side plate 411'.

It will thus be seen that when ram plate 10 is in normal position, that is, fully retracted, preparatory to its operative stroke, it will abut against the upper end of rocker arm 100 causing it to swing inwardly and downwardly and thereby cause the lower end to be rocked forwardly and upwardly placing spring 101 under tension, whereby by means of connecting link 99 rod 97 will be pushed forwardly and rotated so as to cause toggle links 95, 96 to assume the position shown in Figure 29, resulting in the downward pulling of cross bar 93, to a point beneath the adjacent rollers, with members 91, 91' being swung through resulting rotation of rod 92. With device 90 in this position units may move freely along conveyor C for disposition in advance of ram plate 10 for ultimate delivery upon the operative stroke thereof to pattern plates 23, 23'. However, as soon as ram plate 10 commences its outward stroke it will lose contact with rocker arm 100 and the latter, under influence of spring 101 will return to substantially vertical position, thereby causing rod 97 to be retracted and rotated in the opposite direction, and with toggle links 95, 96 being brought into extended relationship, causing cross bar 93 to be raised, as members 91, 91' are swung in the opposite direction, so as to therewith present said rod 93 into the path of units moving along conveyor C to prevent the same from moving beyond that point until ram plate 10 has been returned to retracted position.

In view of the foregoing, it is apparent that stopping device 90 serves to inhibit any untoward interference with ram plate 10 as the same moves through its reciprocal stroke.

*Résumé of operation*

In view of the foregoing, the operation of machine A should be apparent. However, to succinctly recapitulate, the sequence of operation is as follows:

The units to be stacked upon pallet P supported by elevator 40 are moved along conveyor D to conveyor C with the pattern forming means system having been preset so as to effect the turning or non-turning of such units as to move onto conveyor C in accordance with the particular locking pattern to be utilized, which of course will depend upon the nature, size, etc. of the units involved. As a group of units constituting a row of the particular tier to be formed are presented to ram plate 10, series switches S–1, S–2, S–3 and S–4 are closed for closing the circuit to permit outward, operative movement of ram plate 10, for moving such units from conveyor C and onto the collector or pattern plates 23, 23'. This operation is repeated until collector plates 23, 23' support a tier-constituting number of units and thereupon, through the circuitry incorporated, pattern plates 23, 23' will move outwardly away from each other for permitting the tier of units to drop, through gravity, upon pallet *p* which is supported by the elevator 40 at its upper limit of travel. Through action initiated by impulse switch I–2 elevator 40 will be caused to move downwardly a distance substantially equivalent to the height of the units being stacked and at such juncture stopped for receiving the next tier. Thus, elevator 40 will move downwardly at what might be considered, a tier at a time until it reaches its lower limit of travel, with the pallet in fully loaded condition. At such juncture pallet pusher 64, through operation of ejector E, will cause an empty pallet to be moved forwardly onto the lowered elevator 40 with such movement causing discharge of the loaded pallet from machine A. Thus, with elevator 40 now supporting an empty pallet it will be caused to ascend to its upper limit of travel preparatory to receiving the first tier of the next load to be formed. Through the support arrangement pattern plates 23, 23' will be prevented from opening during ascent of elevator 40. During the period pallet is being loaded, the pallet dispenser cylinders 67, 67' are caused to be operated together with associated structure for releasing the lowermost pallet from the stack of empty pallets in chamber 3, whereby the released pallet will be presented with respect to pallet pusher 64 for delivery upon full loading of the pallet being then supported by elevator 40.

Thus, it will be seen that through the operation of stepping switches 502 and R the loading operation is being effected simultaneously with the handling of the empty pallet preparatory to the subsequent loading operation so that the operation of mahcine A is continuous without any undesired interval occurring between the loading of one pallet and the commencement of loading of the next. It will be seen that the operation of machine A is entirely automatic and will continue as long as units for stacking are delivered to machine A and empty pallets are provided in chamber 3. The circuit incorporated in machine A with its various elements is most novel and reliable, assuring of the desired sequence of operations, and not requiring constant attention and supervision by skilled personnel.

It will be recognized that machine A is readily adaptable for use with any type of units to be stacked, whether the same be the customary packing cartons so widely used in industry for various types of merchandise or cases containing empty beverage bottles, bags, large drums or kegs, etc.

Referring once again to Figure 20, it should be recognized that in the event normal operation of pallet dogs 74, 74' is prevented by obstruction caused by pallets in the magazine being out of alignment, a loose board or boards depending from any pallets, and the like, it will be noted that compression springs 76 will, by being placed under tension, absorb the inhibiting force directed upon pallet dogs 74, 74' so as to obviate any damage thereto. It will thus be seen that by dogs 74, 74' being held against normal inward, pallet-supporting movement, arms 71 will be rocked upwardly at their lower ends for transmitting the force to spring 76.

It should be understood that changes and modifications in the form, construction, arrangement, and combination of the several parts of the pallet loading machine may be made and substituted for those herein shown and described without departing from the nature and principle of the present invention.

Having thus described my invention, what I claim and desire to secure by Letters Patent is—

1. For use with a pallet loading machine, a pattern-determining system for non-cubic units to be stacked thereby comprising a first powered conveyor, a second powered conveyor communicating with said first conveyor and having its direction of travel axially perpendicular thereto whereby units moving directly onto said second conveyor from said first conveyor will, through simultaneous subjection to the movement of the first and second conveyors, be turned axially through a ninety degree arc, unit-receiving, vertically movable means provided with said second conveyor and being adapted for movement between inoperative position below, and operative position above, said second conveyor, said unit-receiving means being adapted for traveling movement in a path axially aligned with said first conveyor for receiving selected units from said first conveyor when in operative position and delivering same, upon movement into inoperative position, to said second conveyor for maintaining said unit against axial turning.

2. For use with a pallet loading machine, a pattern-determining system for non-cubic units to be stacked thereby comprising a first powered conveyor, a second powered conveyor communicating with said first conveyor and having its direction of travel axially perpendicular thereto whereby units moving directly onto said second conveyor from said first conveyor will, through simultaneous subjection to the movement of the first and second conveyors, be turned axially through a ninety degree arc, a source of power, a circuit connected to said source of power, a switch provided in said circuit and adapted for actuation by units moving along said first conveyor, means operably connected to said switch for operation responsive to actuation thereof, and a powered unit-receiving conveyor member provided within said second conveyor and mounted for movement between inoperative position below, and operative position above, said second conveyor, said conveyor member being operably engaged to said means, said conveyor being adapted for traveling movement in a path axially aligned with said first conveyor for receiving selected units from said first conveyor when in operative position and delivering same, upon movement into inoperative position, to said second conveyor for maintaining said selected units against axial turning.

3. For use with a pallet loading machine, a pattern-determining system for non-cubic units to be stacked thereby comprising a first powered conveyor, a second powered conveyor communicating with said first conveyor and having its direction of travel axially perpendicular thereto whereby units moving directly onto said second conveyor from said first conveyor will, through simultaneous subjection to the movement of the first and second conveyors, be turned axially through a ninety degree arc, a source of power, a circuit connected to said source of power, a switch provided in said circuit and adapted for actuation by units moving along said first conveyor, a solenoid having an armature connected in said circuit for energization upon actuation of said switch, a unit-receiving powered conveyor member provided within said second conveyor, means connecting said conveyor member, and said solenoid armature, whereby said member is vertically movable between inoperative position below said second conveyor when said solenoid is de-energized and operative position above said second conveyor when said solenoid is energized, said conveyor member being aligned with said first conveyor and being adapted for travel in the same direction as said first conveyor whereby upon return to inoperative position units delivered to said second conveyor will maintain like attitude as on said first conveyor.

4. A pattern determining system as described in claim 3 wherein a presettable selector device is incorporated in said circuit between said switch and said solenoid whereby the latter will be energized by switch closure at only predetermined intervals.

5. A pattern determining system as described in claim 3 wherein a stepping switch having a multiplicity of switch terminals is interposed in the circuit between said switch and said solenoid, preselected switch terminals being connected with said solenoid with the remainder open whereby said solenoid will be energized only in accordance with the sequence determined by the connections of said preselected switch terminals so that units moved along said second conveyor will establish a selected pattern on the pallet to be loaded.

6. For use with a pallet loading machine a pattern-determining system for non-cubic units to be stacked thereby comprising a first powered conveyor, a second powered conveyor communicating with said first conveyor, and having its direction of travel axially perpendicular thereto, whereby units moving on to said second conveyor directly from said first conveyor will be turned through a 90 degree arc, said second conveyor comprising a plurality of spaced apart elements, a unit-receiving device comprising a pair of spaced apart, endless belt members extending in a direction axially parallel with the direction of travel of said first powered conveyor, said belt members being disposed between elements of said second conveyor, drive means for effecting traveling movement of said belt members, means for selectively elevating at least one end of each of said belt members above said second conveyor for receiving a unit directly from said first powered conveyor, and means for lowering said endless belts for depositing a unit received thereon onto said second conveyor whereby the longitudinal axis of such unit will relate to the second conveyor in the same manner as the same related to the first conveyor.

7. For use with a pallet loading machine, a unit-receiving device as described in claim 6, wherein the normally outer end portions of said endless belts are trained about fixed pulleys and the inner ends thereof are trained about a vertically shiftable pulley.

8. For use with a pallet loading machine, a unit-receiving device as described in claim 6, wherein the means for elevating at least one end of said endless belts comprises a solenoid having an armature, links engaged to the end of said solenoid, and pulleys adapted for vertical shiftable movement engaged to said links, and said endless belts being engaged about their vertically shiftable pulleys.

9. For use with a pallet loading machine, a unit-receiving device as described in claim 8, wherein a rockable, switch-actuating device is provided adjacent said unit-receiving device for presentation spacedly upwardly of said endless belts, means connecting said switch-actuating device and said solenoid whereby engagement of said switch-actuating device by a unit received on said unit-receiving member will effect de-energization of said solenoid with consequent lowering of said unit-receiving member to permit deposition of the unit thereon onto said second powered conveyor.

References Cited in the file of this patent

UNITED STATES PATENTS

| | | |
|---|---|---|
| 1,158,045 | Graham | Oct. 26, 1915 |
| 2,266,170 | Currie | Dec. 16, 1941 |
| 2,633,251 | Bruce | Mar. 31, 1953 |
| 2,703,182 | Broberg et al. | Mar. 1, 1955 |
| 2,716,497 | Wahl et al. | Aug. 30, 1955 |
| 2,730,247 | Lawson | Jan. 10, 1956 |
| 2,780,340 | Hynson | Feb. 5, 1957 |

FOREIGN PATENTS

| | | |
|---|---|---|
| 297,635 | Switzerland | June 1, 1954 |